US012284514B2

(12) United States Patent
Zeng et al.

(10) Patent No.: US 12,284,514 B2
(45) Date of Patent: Apr. 22, 2025

(54) MUTUAL AUTHENTICATION TECHNIQUES FOR DRONE DELIVERY

(71) Applicant: University of South Carolina, Columbia, SC (US)

(72) Inventors: Qiang Zeng, West Columbia, SC (US); Lannan Luo, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 124 days.

(21) Appl. No.: 17/854,060

(22) Filed: Jun. 30, 2022

(65) Prior Publication Data

US 2023/0068989 A1 Mar. 2, 2023

Related U.S. Application Data

(60) Provisional application No. 63/238,885, filed on Aug. 31, 2021.

(51) Int. Cl.
*H04W 12/06* (2021.01)
*G06Q 10/08* (2024.01)
*G06Q 10/0832* (2023.01)
*H04W 12/0431* (2021.01)
*H04L 9/40* (2022.01)

(52) U.S. Cl.
CPC ........ *H04W 12/06* (2013.01); *G06Q 10/0832* (2013.01); *H04W 12/0431* (2021.01); *G06Q 10/08* (2013.01); *H04L 63/0869* (2013.01)

(58) Field of Classification Search
CPC . H04W 12/06; H04W 12/0431; H04W 12/03; G06Q 10/0832; G06Q 10/08; H04L 63/0869
See application file for complete search history.

(56) References Cited

U.S. PATENT DOCUMENTS

| | | | |
|---|---|---|---|
| 9,359,074 B2 | 6/2016 | Ganesh et al. | |
| 9,459,620 B1 | 10/2016 | Schaffalitzky | |
| 10,168,700 B2* | 1/2019 | Gordon | B64U 10/13 |
| 10,592,843 B2 | 3/2020 | Natarajan et al. | |
| 2016/0342934 A1* | 11/2016 | Michalik | G06Q 10/083 |
| 2022/0180305 A1* | 6/2022 | Kim | H04L 63/0869 |

OTHER PUBLICATIONS

"CoMAD: Context-Aware Mutual Authentication Protocol for Drone Networks"—Cabuk et al., IEEE Explore, May 25, 2021 https://ieeexplore.IEEE.org/document/9440478 (Year: 2021).*
"A Provably Secure and Lightweight Authentication Scheme for Internet of Drones for Smart City Surveillance"—Nikooghadam et al., Elsevier, Journal of Systems Architecture, vol. 115, May 2021 https://www.sciencedirect.com/science/article/pii/S138376212030206X (Year: 2021).*

* cited by examiner

*Primary Examiner* — Randy A Scott
(74) *Attorney, Agent, or Firm* — Offit Kurman; Douglas L. Lineberry

(57) ABSTRACT

Described herein are methods, techniques and systems for a user to conduct authentication via inertial measurement unit data collected by the user's smartphone and video data collected by a drone recording the user operations for mutual authentication, as well as to prevent attacks of the authentication data, wherein correlation can be easily extended to using other information, such as noises, illuminance, GPS, and how the phone flashlight flashes.

20 Claims, 14 Drawing Sheets

Table 1: Comparison. ✓: true, ✗: false, ?: unclear.

| Technique | G1 | G2 | G3 | G4 |
|---|---|---|---|---|
| Face/gait/speaker recognition | ✓ | ✗ | ✗ | ✓ |
| Google (scanning QR code) [88] | ✓ | ✗ | ✗ | ✓ |
| Qualcomm (purchase code) [38] | ✓ | ✗ | ✗ | ✓ |
| Walmart (beacon) [67] | ✗ | ✓ | ✗ | ✓ |
| SoundUAV [71] | ✗ | ✗ | ✗ | ✓ |
| Distance bounding [10] | ✗ | ✓ | ? | ✗ |
| G2AUTH | ✓ | ✓ | ✓ | ✓ |

FIG. 1

(a) Smartphone     (b) Drone's camera

Table 2: Authentication time (and standard deviation).

| Part | *without* pauses | *with* pauses |
|---|---|---|
| Authentication Operations | 3250 (732.2) ms | 4421 (1083.4) ms |
| Data Transmission | 72 (8.7) ms | 79 (9.8) ms |
| Data processing and Decision Making | 34 (8.2) ms | 36 (8.8) ms |

FIG. 11

TABLE 3: Phone tracking success rates.

| Algorithms | Flashlight off | | Flashlight on | |
| --- | --- | --- | --- | --- |
| | day | night | day | night |
| CSRT [59] | 0.58 | 0.12 | 0.86 | 1.00 |
| ECO [17] | 0.74 | 0.22 | 0.95 | 1.00 |
| RT-MDNet [47] | 0.74 | 0.24 | 0.96 | 1.00 |
| ATOM [16] | 0.76 | 0.24 | 0.96 | 1.00 |
| DiMP [9] | 0.76 | 0.26 | 0.98 | 1.00 |
| PrDiMP [18] | 0.80 | 0.26 | 0.98 | 1.00 |

FIG. 12

MUTUAL AUTHENTICATION TECHNIQUES FOR DRONE DELIVERY

STATEMENT REGARDING FEDERALLY SPONSORED RESEARCH

This invention was made with government support under CNS1856380, CNS1815144, and CNS2016415 awarded by the National Science Foundation. The government has certain rights in the invention.

TECHNICAL FIELD

The subject matter disclosed herein is generally directed to methods, techniques and systems for a user to conduct authentication via inertial measurement unit data collected by the user's smartphone and video data collected by a drone recording the user operations for mutual authentication, as well as to prevent attacks of the authentication data, wherein correlation can be easily extended to using other information, such as noises, illuminance, GPS, and how the phone flashlight flashes.

BACKGROUND

Due to its cost effectiveness and timeliness, package delivery using unmanned aerial vehicles (UAVs), called drone delivery, is drawing growing attention. Authentication of drones and users is critical for ensuring that a package is not picked up by an attacker's drone or delivered to an attacker. As delivery drones are costly and may carry sensitive or expensive packages, a drone should not get very close to a person unless she is authenticated; thus, conventional authentication approaches that require human-drone physical contact, such as fingerprint scanning, do not work.

Existing authentication methods for drone delivery suffer from one or multiple of the following limitations: (1) requiring special user-side hardware; (2) enforcing one-way authentication only; (3) being vulnerable to relay attacks; (4) having compatibility issues. We present the first system, named Greet-to-Auth (G2Auth, for short), that supports mutual authentication between a user and a drone, without these limitations. A user waves her hand holding a smartphone to conduct the authentication. The evaluation shows that it is secure, accurate, usable, and robust.

Citation or identification of any document in this application is not an admission that such a document is available as prior art to the present disclosure.

SUMMARY

The above objectives are accomplished according to the present disclosure by providing a method for authenticating a drone delivery. The method may include an order being placed for delivery via at least one drone, the drone coming into physical proximity with the communication device, the at least one communication device being moved and generating an inertial measurement unit, the at least one drone, via a camera, records movement of the at least one communication device to generate drone recorded communications device data; generating waving operation information at the at least one drone and at the at least one communication device based on the initial measurement unit and the drone recorded smartphone data; wherein the at least one drone and at least one communication device exchange the waving operation information with one another via a key-protected communication channel; and wherein the at least one communication device and the at least one drone independently perform mutual authentication of the waving operation information. Further, the method may be employed at day or night. Again, the at least one communication device may be a smartphone. Still yet, no physical contact may be required between the at least one communication device and the at least one drone. Still again, when a delivery task is assigned to the at least one drone, a unique session key may be generated and distributed to the at least one drone and the at least one communication device. Further again, when the at least one drone arrives at a designated location it may establish the key-protected communication channel. Further, after the at least one communication device and the at least one drone independently conclude mutual authentication of the waving operation information, the package may be delivered by the at least one drone. Still yet, the waving operation information may cause the at least one communication device to generate a sequence of acceleration and gyroscope data and the camera on the at least one drone may record the trajectory of the at least one communication device. Furthermore, the method may generate waving operation information based on a flashlight on the smartphone. Still yet further, the least one communication device may pause movement when generating the inertial measurement unit.

In a further embodiment, a system for authenticating a drone delivery is provided. The system may include at least one drone, at least one communication device, wherein the at least one communication device may be moved and generates an inertial measurement unit; wherein the at least one drone may have a camera to record movement of the at least one communication device to generate drone recorded smartphone data; generating waving operation information at the drone and at the at least one communication device based on the initial measurement unit and the drone recorded smartphone data; wherein the at least one drone and at least one communication device may exchange the waving operation information with one another via a key-protected communication channel; and wherein the at least one communication device and the at least one drone independently perform mutual authentication of the waving operation information.

Further, the system may be employed at day or night. Yet again, the at least one communication device may comprise a smartphone. Still further, no physical contact may be required between the at least one communication device and the at least one drone. Further again, when a delivery task is assigned to the at least one drone, a unique session key may be generated and distributed to the at least one drone and the at least one communication device. Again still, when the at least one drone arrives at a designated location it may establish the key-protected communication channel. Furthermore, after the at least one communication device and the at least one drone independently conclude mutual authentication of the waving operation information, the package may be delivered by the at least one drone. Again still, the waving operation information may cause the at least one communication device to generate a sequence of acceleration and gyroscope data and the camera on the at least one drone records the trajectory of the at least one communication device. Further again, the method may generate waving operation information based on a flashlight on the smartphone. Still further again, the least one communication device may pause movement when generating the inertial measurement unit.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1 shows Table 1.

FIG. 11 shows Table 2, authentication time and standard deviation.

FIG. 12 shows Table 3, phone tracking success rates.

Figure 2:
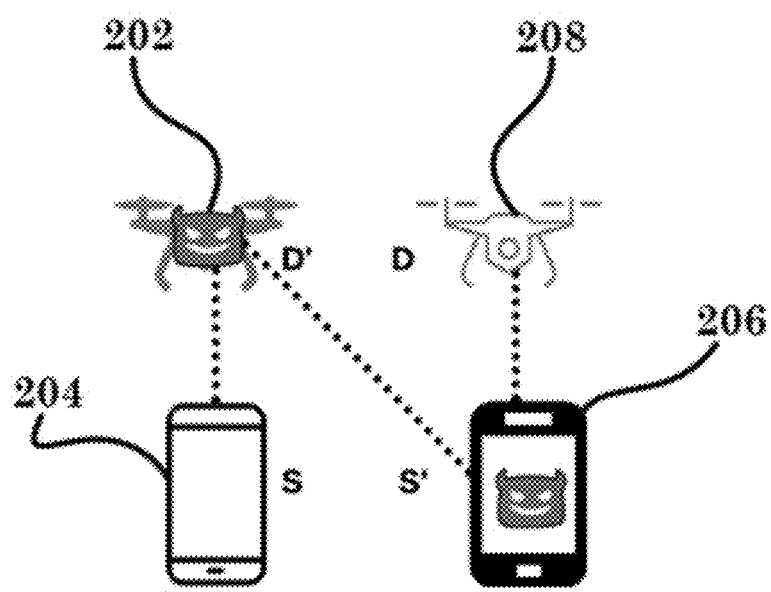
FIG. 2 shows an example Relay Attack.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the authentication structures, methods, systems and/or techniques described herein can be presented as a combination kit. As used herein, the terms "combination kit" or "kit of parts" refers to the devices, phones, drones, and any additional components that are used to package, sell, market, deliver, and/or provide the combination of elements or a single element, such as an authentication structure. Such additional components include, but are not limited to, packaging, instructions, user manuals, and the like. When the authentication structures, methods, systems and/or techniques described herein are not provided simultaneously, the combination kit can contain each in a separate kit/package. The separate kit components can be contained in a single package or in separate packages within the kit.

In some embodiments, the combination kit also includes instructions, user manuals, etc., printed on or otherwise contained in a tangible medium of expression. The instructions can provide information regarding the content of the kit(s), safety information, directions, protocols and usage information regarding the authentication structures, methods, systems and/or techniques described herein.

The present disclosure provides methods, techniques and systems for a user, with her smartphone in the hand, waves her hand to conduct authentication. G2Auth is established on this simple yet solid fact: the IMU (inertial measurement unit) data collected by the user's smartphone during waving and the video data collected by the drone recording the waving operations should correlate, and can be used for mutual authentication. Relaying the authentication data will not help the attacker, as what the drone sees has to match what is relayed. Plus, it is difficult for a mimicry attacker (who mimics the legitimate user waving a hand) to closely replicate the waving operations of a legitimate user, as the average human reaction time is greater than 200 ms, which can be detected by our system. The correlation-based idea can be easily extended to using other information other than waving, such as noises, illuminance, GPS, and how the phone flashlight flashes.

Due to its cost effectiveness and timeliness, package delivery using unmanned aerial vehicles (UAVs), called drone delivery, is drawing growing attention. Authentication of drones and users is critical for ensuring that a package is not picked up by an attacker's drone or delivered to an attacker. As delivery drones are costly and may carry sensitive or expensive packages, a drone should not get very close to a person unless she is authenticated; thus, conventional authentication approaches that require human-drone physical contact, such as fingerprint scanning, do not work. Existing authentication methods for drone delivery suffer from one or multiple of the following limitations: (1) requiring special user-side infrastructure; (2) enforcing one-way authentication only; (3) being vulnerable to relay attacks. We present the first system, dubbed Greet-to-Auth, that supports mutual authentication between a user and a drone, without these limitations.

A user who holds a smartphone waves her hand a few times to finish the authentication. The evaluation shows that it is secure, usable, accurate, and robust. The emerging drone delivery service is drawing enormous attention due to its cost effectiveness and convenience. The market is projected to be $29 billion by 2027. Giant retailers, such as AMAZON and WALMART, and courier service companies, like UPS and DHL, are actively developing and deploying drone delivery. Recently, Amazon obtained FAA approval for drone delivery, CBS News. 2020. Amazon delivery drones receive FAA approval. www.cbsnews.com/news/amazon-prime-air-deliverydrones-faa-approval/, bringing the technique one step closer to a large number of users. A U.S. startup company, Zipline, has used drones for rapidly delivering life-saving medical supplies, such as blood, in areas with poor infrastructure. Evan Ackerman and Michael Koziol. 2019. In the Air With Zipline's Medical Delivery Drones. spectrum.ieee.org/in-the-air-with-ziplines-medicaldelivery-drones.

This forecast popularity makes drone delivery an attractive attack target. Among many attacks, impersonation attacks are likely against drone delivery. In the case of drone-based courier services, e.g., where a delivery drone collects a package from the sender and delivers it to the designated receiver, attackers can launch at least two kinds of impersonation attacks: (1) pickup-time impersonation, where an attacker-controlled drone impersonates the legitimate one in order to steal a package, and (2) delivery-time impersonation, where an attacker impersonates the legitimate receiver. This is analogous to real-world impersonation attacks where criminals claim themselves as delivery personnel or legitimate receivers. Furthermore, (3) a drone controlled by an attacker may impersonate a legitimate drone (e.g., by using the same model and painting) to deliver a dangerous package to a target user, which is a variant of delivery-time impersonation. In order to defeat such attacks, authentication of drones and users is critical.

Delivery drones are expensive and may carry important packages. To prevent attackers from capturing drones, a drone should stay beyond the reach of persons until authentication is done. This imposes a unique constraint on authentication. Many conventional authentication approaches, such as scanning fingerprints by touching the drone's sensor, are not secure options.

We aim at the following goals: (G1) no need of special userside hardware; (G2) mutual user-drone authentication; (G3) being resilient to attacks, such as relay attacks discussed below; and (G4) no compatibility issues between drones and user-side. The current disclosure examined existing authentication approaches that allow the drone to stay away from persons, but none meet all the goals. We summarize some of the most relevant techniques in Table 1, see FIG. 1. Face, gait, or speaker recognition can be used for authentication, without involving human-drone physical contact; but there are many known attacks against face recognition, see Yinpeng Dong, Hang Su, Baoyuan Wu, Zhifeng Li, Wei Liu, Tong Zhang, and Jun Zhu. 2019. *Efficient decision-based black-box adversarial attacks on face recognition. In Proceedings of the IEEE Conference on Computer Vision and Pattern Recognition.* 7714-7722 and Mahmood Sharif, Sruti Bhagavatula, Lujo Bauer, and Michael K Reiter. 2016. *Accessorize to a crime: Real and stealthy attacks on state-of-the art face recognition. In Proceedings of the 2016 acm sigsac conference on computer and communications security (CCS).* 1528-1540, gait recognition, see Davrondzhon Gafurov. [n.d.]. *A survey of biometric gait recognition: Approaches, security and challenges. In Annual Norwegian computer science conference* and Davrondzhon Gafurov, Einar Snekkenes, and Patrick Bours. 2007. *Spoof attacks on gait authentication system. IEEE Transactions on Information Forensics and Security* 2, 3 (2007), 491-502., and speaker recognition, see Felix Kreuk, Yossi Adi, Moustapha Cisse, and Joseph Keshet. 2018. *Fooling end-to-end speaker verification with adversarial examples. In 2018 IEEE International Conference on Acoustics, Speech and Signal Processing (ICASSP).* IEEE, 1962-1966., Yi Xie, Cong Shi, Zhuohang Li, Jian Liu, Yingying Chen, and Bo Yuan. 2020. *Real-time, universal, and robust adversarial attacks against speaker recognition systems. In IEEE International Conference on Acoustics, Speech and Signal Processing (ICASSP).* 1738-1742. (G3: X). Plus, it cannot authenticate drones (G2: X) and needs to profile how the user looks/walks/speaks, which harms usability. AMAZON's process, Frederik Schaffalitzky. 2016. Human interaction with unmanned aerial vehicles. U.S. Pat. No. 9,459,620, proposes to authenticate a user by having the drone scan a QR code on the user's smartphone. But it is vulnerable to vision relay attacks, identified by this work.

In FIG. 2, a malicious drone 202, which hovers in front of the legitimate user and can scan the code on her legitimate phone 204, records and relays the content to the attacker's malicious phone 206; the latter shows the code to AMAZON's legitimate drone 208. As a result, the user thinks 202 hovering in front of it is AMAZON's drone 208, and AMAZON's drone 208 perceives the attached to be the legitimate user. (G3: X). In Qualcomm's patent, Shriram Ganesh and Jose Roberto Menendez. 2016. Methods, systems and devices for delivery drone security—U.S. Pat. No. 9,359,074, a user uses her smartphone to send a one-time purchase code or digital token to the drone. It is vulnerable to radio relay attacks, see Lishoy Francis, Gerhard P Hancke, Keith Mayes, and Konstantinos Markantonakis 2011. *Practical Relay Attack on Contactless Transactions by Using*

NFC Mobile Phones. *IACR Cryptology ePrint Archive* 2011 (2011), Gerhard Hancke. 2005. *A practical relay attack on ISO* 14443 *proximity cards. Technical Report.*, José Vila and Ricardo J. Rodríguez. 2015. *Practical Experiences on NFC Relay Attacks with Android. In Radio Frequency Identification.* (G3: X). Neither of the two patents considers authentication of drones (G2: X).

Other approaches require special user-side infrastructure. For example, WALMART's patent, Chandrashekar Natarajan, Donald R High, and V John J O'Brien: 2020—Unmanned aerial delivery to secure location—U.S. Pat. No. 10,592,843, needs the user-side dock/lockbox to be installed (G1: X). It uses a beacon transmitter and a reader to facilitate authentication, and is vulnerable to radio relay attacks (G3: X). SOUNDUAV, Soundarya Ramesh, Thomas Pathier, and Jun Han. 2019. *SoundUAV: Towards Delivery Drone Authentication via Acoustic Noise Fingerprinting. In Proceedings of the 5th Workshop on Micro Aerial Vehicle Networks, Systems, and Applications.* 27-32, exploits the fact that the motor noises generated by each drone are unique.

A user-side dock installed with microphone authenticates a drone based on its sound fingerprint. It needs dedicated user-side infrastructure (G1: X), only supports authentication of drones (G2: X), and is vulnerable to record-and-replay attacks (G3: X). It needs per-drone profiling and it is unclear whether the motor noises change over time.

To address relay attacks, distance-bounding protocols, see Stefan Brands and David Chaum. 1993. *Distance-bounding protocols. In Workshop on the Theory and Application of Cryptographic Techniques. Springer,* 344-359, are proposed to calculate an upper bound of the distance between participants, based on the fact that radio travels nearly at the speed of light. As the accuracy is sensitive to the slightest processing latency, it requires special hardware Kasper Bonne Rasmussen and Srdjan Capkun. 2010. *Realization of RF Distance Bounding. In USENIX Security Symposium,* 389-402, that is not widely available yet (G1: X). Since its security is still being actively studied Cas Cremers, Kasper B Rasmussen, Benedikt Schmidt, and Srdjan Capkun. 2012. *Distance hijacking attacks on distance bounding protocols. In IEEE Symposium on Security and Privacy (S&P). IEEE,* 113-127, Sjouke Mauw, Zach Smith, Jorge Toro-Pozo, and Rolando Trujillo-Rasua. 2018. *Distance-bounding protocols: Verification without time and location. In 2018 IEEE Symposium on Security and Privacy (S&P).* IEEE, 549-566, and new attacks have been proposed, Gildas Avoine, Muhammed Ali Bingöl, Ioana Boureanu, Srdjan Čapkun, Gerhard Hancke, Süleyman Kardaş, Chong Hee Kim, Cédric Lauradoux, Benjamin Martin, Jorge Munilla, et al. 2018. *Security of distance-bounding: A survey. ACM Computing Surveys (CSUR)* 51, 5 (2018), 1-33, (G3:?), standard design and protocol do not exist. Thus, even if a user owns a device that supports a certain distance-bounding protocol, the compatibility issues between a drone and the device cannot be ignored (G4: X).

The current disclosure proposes a drone-delivery authentication technique, dubbed Greet-to-Auth (G2Auth, for short), that meets all the goals. It does not need special user-side infrastructure but just a smartphone (G1: ✓).

A user who holds a smartphone waves her hand to conduct authentication. G2Auth is established on this simple yet solid fact: the IMU (inertial measurement unit) data collected by the user's smartphone during waving, which can be regarded as ground truth assuming the phone is not compromised, and the video data collected by the drone recording the waving operations should correlate, and can be used for mutual authentication (G2: ✓). Plus, it is difficult for a mimicry attacker (who mimics the legitimate user waving her hand) to closely replicate the waving operations of a legitimate user, as the average human reaction time is greater than 200 ms, see T. P. Ghuntla, H. B. Mehta, P. A. Gokhale, and C. J. Shah. 2012. *A Comparative Study of Visual Reaction Time in Basketball Players and Healthy Controls. National Journal of Integrated Research in Medicine* 3, 1 (2012), Aditya Jain, Ramta Bansal, Avnish Kumar, and K. D. Singh. 2015. *A comparative study of visual and auditory reaction times on the basis of gender and physical activity levels of medical first year students. International Journal of Applied & Basic Medical Research* 5, 2 (2015), Daniel V. McGehee, Elizabeth N. Mazzae, and G. H. Scott Baldwin. 2000, *Driver Reaction Time in Crash Avoidance Research: Validation of a Driving Simulator Study on a Test Track. In Proceedings of the Human Factors and Ergonomics Society Annual Meeting,* which is detected as attacks by our system (G3: ✓). Furthermore, G2Auth does not cause compatibility issues (G4: ✓).

To deliver a robust, accurate, and secure solution, the following challenges need to be resolved. First, different users wave their smartphones in different ways, causing very different data. It is critical to examine whether correlation exists regardless of the waving style. We thus perform correlation studies about the robustness, see infra.

Second, it is highly desired that drone delivery can be conducted day and night. When the light level is low (e.g., night time), recognizing a small object and keeping track of it using a camera is still not well resolved in the computer vision area. Moreover, colors of the user's skin/clothes or the background may be similar to that of the held phone. We tried various state-of-the-art object tracking methods, but all failed frequently in such situations. We propose a simple yet effective solution to make the system work well in different situations, see infra.

Third, data from IMUs and cameras are heterogeneous and cannot be compared directly. Based on the object tracking results, we convert the waving trajectory into an acceleration curve. We propose a series of features and leverage machine learning for correlation calculation, see infra.

Finally, a determined attacker may practice to mimic a victim user. Defeating such trained mimicry attacks is a challenge. We propose a usable countermeasure by having the user add random pauses when changing the waving direction, effectively defeating trained mimicry attacks.

We built a prototype of G2Auth and performed a comprehensive evaluation, see infra. Below is a subset of the questions the evaluation has studied. Can the system be used to authenticate users never seen during training? Can it work at night and in various weather? Is it resilient to mimicry attackers? The evaluation gives positive answers to all the questions. For example, the area under the curve (AUC) is over 0.9988 for users never seen during training, providing very high accuracy.

This disclosure provides the following contributions.

We examine existing authentication approaches and illustrate why they cannot be applied to drone delivery. Existing approaches require special user-side hardware, only support one-way authentication, are vulnerable to relay attacks, and/or have compatibility issues. We identify requirements for a drone-delivery authentication system.

We propose the first authentication approach for drone delivery that meets all the necessary requirements. We resolve multiple challenges to deliver a robust, accurate, and secure design, which copes with different waving styles, supports authentication during nighttime, compares heterogeneous data, and tackles mimicry attacks.

We build a prototype system and the evaluation demonstrates its high accuracy, security, robustness, and usability.

To prove a legitimate drone is in proximity to a user's phone, an intuitive solution is to use radio characteristics, such as reduced-range Bluetooth, RSSI (Received Signal Strength Indicator), radio fingerprinting, etc. Given a key-protected communication channel and the "proven" proximity, it seems that the authentication can be conducted securely by transmitting a purchase code, just like Qualcomm's patent.

However, researchers have repetitively shown the insecurity of such proximity-proving techniques. For instance, the practicality of relay attacks (aka Mafia Fraud Attacks), see Yvo Desmedt, Claude Goutier, and Samy Bengio. 1987. *Special uses and abuses of the Fiat-Shamir passport protocol. In Conference on the Theory and Application of Cryptographic Techniques.* Springer, 21-39, against the keyless entry system of modern cars, without cracking their crypto-keys, has been well demonstrated in the famous work, see Aurélien Francillon, Boris Danev, and Srdjan Capkun. 2011. *Relay attacks on passive keyless entry and start systems in modern cars. In Proceedings of the Network and Distributed System Security Symposium (NDSS).* Eidgenössische Technische Hochschule Zürich, Department of Computer Science. Car thefts applying relay attacks are not only real but also cheap ($22). Readers are referred to Boris Danev, Heinrich Luecken, Srdjan Capkun, and Karim El Defrawy. 2010. *Attacks on physical-layer identification. In Proceedings of the third ACM conference on Wireless network security.* 89-98 and Aanjhan Ranganathan and Srdjan Capkun. 2017. *Are we really close? verifying proximity in wireless systems. IEEE Security & Privacy* (2017), about the insecurity of applying RSSI, radio fingerprinting, etc.

Actually, the concern about the insecurity of the intuitive proximity proving has been one of the main motivations of studying distance-bounding protocols, Saar Drimer, Steven J Murdoch, et al. 2007. *Keep Your Enemies Close: Distance Bounding Against Smartcard Relay Attacks. In USENIX security symposium*, Vol. 312. However, they do not meet our goals either.

System Overview

Design Choices

Below, we discuss why some more straightforward designs for drone-delivery authentication are not adopted in our system.

Distance Bounding. The concern about the insecurity of the intuitive proximity proving approaches, see supra, has been one of the main motivations of studying distance-bounding protocols. See, Saar Drimer, Steven J Murdoch, et al. 2007. Keep Your Enemies Close: Distance Bounding Against Smartcard Relay Attacks. In USENIX security symposium (USENIX Security). However, as explained supra, they do not meet the goals of the present disclosure because of the following issues. (1) It requires special user-side hardware that supports, e.g., UWB (ultra wideband), see Sinan Gezici, Zhi Tian, Georgios B Giannakis, Hisashi Kobayashi, Andreas F Molisch, H Vincent Poor, and Zafer Sahinoglu. 2005. *Localization via ultrawideband radios: a look at positioning aspects for future sensor networks. IEEE signal processing magazine* 22, 4 (2005) and Marc Kuhn, Heinrich Luecken, and Nils Ole Tippenhauer. 2010. *UWB impulse radio based distance bounding.* In 2010 7th *workshop on positioning, navigation and communication. IEEE.* It is particularly unrealistic to require all users in rural areas to own high-end devices that support distance bounding. (2) The security of distance bounding is still being actively studied, see Cas Cremers, Kasper B Rasmussen, Benedikt Schmidt, and Srdjan Capkun. 2012. *Distance hijacking attacks on distance bounding protocols.* In IEEE Symposium on Security and Privacy (S&P). IEEE and Sjouke Mauw, Zach Smith, Jorge Toro-Pozo, and Rolando Trujillo-Rasua. 2018. Distance-bounding protocols: Verification without time and location. In 2018 IEEE Symposium on Security and Privacy (S&P), as new attacks are proposed. See, Gildas Avoine, Muhammed Ali Bingöl, Ioana Boureanu, Srdjan Čapkun, Gerhard Hancke, Süleyman Kardaş, Chong Hee Kim, Cédric Lauradoux, Benjamin Martin, Jorge Munilla, et al. 2018. *Security of distance-bounding: A survey. ACM Computing Surveys (CSUR)* 51, 5 (2018). (3) Due to the lack of standards, the compatibility issue between drones and the diverse user-side devices is a barrier to wide deployment. Instead of relying on distance bounding, the current disclosure looks for an inexpensive solution that can be widely deployed without requiring special user-side hardware. Using QR Code. In order to detect the vision relay attack illustrated in FIG. 2, one may propose to detect the extra delay incurred by the attack. Specifically, when a QR code is displayed, the user's smartphone S can record the timestamp $T_S$ and the legitimate drone D can record the timestamp when it captures the image containing the QR code. Presumably, the measurement of $T_D-T_S$, when there are no vision relay attacks, should be smaller than the measurement when there are.

The extra delay incurred by a vision relay attack is mainly affected by the malicious drone's camera frame rate and the malicious smartphone's display refresh rate (note the latency due to the extra radio signal relay is 20 μs or less, see Aurélien Francillon, Boris Danev, and Srdjan Capkun. 2011. *Relay attacks on passive keyless entry and start systems in modern cars. In Proceedings of the Network and Distributed System Security Symposium (NDSS),* which is negligible compared to the delays discussed below). Assuming the malicious drone uses a camera with fps=240 and a phone with the display refresh rate 144 Hz, the extra latency due to the attack is around 11.1 ms. (A recent study shows that a fast digital camera provides a latency lower than 5 ms and an analog system can make it even shorter, see Sven Ubik and Jiří Pospíšilík. 2020. *Video camera latency analysis and measurement. IEEE Transactions on Circuits and Systems for Video Technology* 31, 1 (2020).) On the side of legitimate users, however, most smartphones today have a display refresh rate of 60 Hz, see Deepak Rajawat. 2022. 10 *Best 90 Hz and* 120 *Hz Display Refresh Rate Phones To Buy In* 2022. www.smartprix.com/bytes/best-90hz-120hz-refreshrate-display-phones/, meaning the screen updates one frame every 16.7 ms. After the QR code is shown on the display at its next refresh cycle, it is captured by the next frame of the drone's camera. As a result, it is difficult to distinguish whether a small extra delay is due to an attack or the display refresh of the user's smartphone and the speed of the legitimate drone's camera.

Blinking Flashlight. Similarly, one may propose to randomly blink the flashlight of the user's smartphone and compare the timestamps recorded by the smartphone and the drone. However, because of the camera latency, even after the flashlight is turned on, it needs the next frame of the camera to record it. Given a low-latency attack system described above, it is difficult to decide whether a small delay is due to an attack. Moreover, an attacker may use a phototransistor, which is used to detect the light, to build an analog system, to make the latency even smaller. See, Aurélien Francillon, Boris Danev, and Srdjan Capkun. 2011.

Relay attacks on passive keyless entry and start systems in modern cars. *In Proceedings of the Network and Distributed System Security Symposium (NDSS).*

The straightforward but insecure designs, such as checking RSSI, using QR code, and blinking the flashlight, illustrate that there are pitfalls for devising an authentication system for drone delivery. The common limitation of checking RSSI, using QR code and blinking the flashlight is that the element for authentication can be easily and precisely "cloned" by an attacker. Therefore, it is critical to design an authentication element that can be easily captured by the legitimate entities but difficult to clone.

Threat Model

Mounting radio relay attacks. Like breaking the keyless entry system of a car, see Aurélien Francillon, Boris Danev, and Srdjan Capkun. 2011. *Relay attacks on passive keyless entry and start systems in modern cars.* In *Proceedings of the Network and Distributed System Security Symposium (NDSS).* Eidgenössische Technische Hochschule Zürich, Department of Computer Science., Wired. 2017. *Just a Pair of These $11 Radio Gadgets Can Steal a Car.* www.wired.com/2017/04/just-pair-11-radio-gadgetscan-steal-car/], relay attacks can fool authentication systems proposed for drone delivery, such as, Shriram Ganesh and Jose Roberto Menendez. 2016. Methods, systems and devices for delivery drone security. U.S. Pat. No. 9,359,074, Chandrashekar Natarajan, Donald R High, and V John J O'Brien. 2020. Unmanned aerial delivery to secure location. U.S. Pat. No. 10,592,843, and Frederik Schaffalitzky. 2016. Human interaction with unmanned aerial vehicles. U.S. Pat. No. 9,459,620.], (they are described, see supra). For example, given a key-protected Bluetooth channel in FIG. 2, without knowing the key, malicious drone 202 and malicious phone 206 can simply relay the Bluetooth signals between legitimate drone 208 and legitimate phone 204, such that even when legitimate drone 208 and legitimate phone 204 are far away from each other, both legitimate drone 208 and legitimate phone 204 can be fooled to believe the proximity and conduct the authentication. The current disclosure threat model assumes attackers have the capability to launch relay attacks, such that an attacker can use a malicious hovering drone to fool a victim user to start the authentication procedure and relay the encrypted traffic.

Next, we describe two concrete scenarios to launch relay attacks against drone delivery (while there may exist other scenarios). (1) Nearby attackers. Given a popular place (e.g., a square or apartment building), when an attacker notices a delivery drone is approaching, he (or his ally) controls a malicious drone to fly towards the place as well. Note GPS has inaccuracy up to 4.9 m GPS.gov. 2015. GPS Accuracy. www.gps.gov/systems/gps/performance/accuracy/; as long as the attacker is close to the victim user within a few meters, the delivery drone cannot distinguish the attacker from the victim using GPS. Then, the radio relay attacks can be launched as illustrated In FIG. 2. (2) Remote attackers. A remote attacker can leverage GPS spoofing to mislead a drone to fly to his location, and meanwhile send a malicious drone to the user's location. Note if there are some routine delivery or pick-up services for a user (e.g., USPS delivers for her neighborhood around 2-4 pm), an attacker can predict the path of the drone and the location of the user. Or, an attacker can use a drone to follow a delivery drone and launch attacks when the drone slows down and prepares landing, which implies that it is near the victim user's location. GPS spoofing is a main threat to civilian UAVs, as civilian GPS signals are not encrypted.

In GPS spoofing, the attacker transmits fabricated GPS signals with stronger power than the authentic ones, causing the victim receiver to lock onto the attacker's signals, see Junjie Shen, Jun Yeon Won, Zeyuan Chen, and Qi Alfred Chen. 2020. *Drift with Devil: Security of Multi-Sensor Fusion based Localization in High-Level Autonomous Driving under {GPS} Spoofing.* In 29th {USENIX} Security Symposium ({USENIX} Security 20). 931-948. It has been demonstrated on drones, see Andrew J Kerns, Daniel P Shepard, Jahshan A Bhatti, and Todd E Humphreys. 2014. *Unmanned aircraft capture and control via GPS spoofing. Journal of Field Robotics* 31, 4 (2014), 617-636 and Daniel P Shepard, Jahshan A Bhatti, Todd E Humphreys, and Aaron A Fansler. 2012. *Evaluation of smart grid and civilian UAV vulnerability to GPS spoofing attacks.* In *Radionavigation Laboratory Conference Proceedings,* (and many other devices), and GPS spoofers can be made from inexpensive commercial off-the-shelf components, see Kexiong Curtis Zeng, Shinan Liu, Yuanchao Shu, Dong Wang, Haoyu Li, Yanzhi Dou, Gang Wang, and Yaling Yang. 2018. *All your {GPS} are belong to us: Towards stealthy manipulation of road navigation systems.* In 27th {USENIX} Security Symposium ({USENIX} Security 18). 1527-1544. Recent research shows the difficulty in handling GPS spoofing, see Junjie Shen, Jun Yeon Won, Zeyuan Chen, and Qi Alfred Chen. 2020. *Drift with Devil: Security of Multi-Sensor Fusion based Localization in High-Level Autonomous Driving under {GPS} Spoofing.* In 29th {USENIX} Security Symposium ({USENIX} Security 20). 931-948, which is a separate and long-lasting problem.

Mimicry Attacks. With the help of relay attacks, an adaptive attacker A, who knows how G2Auth works, can mimic a user's hand waving in order to fool G2Auth, which we call mimicry attacks. As the average human reaction time is slower than 200 ms, see T. P. Ghuntla, H. B. Mehta, P. A. Gokhale, and C. J. Shah. 2012. *A Comparative Study of Visual Reaction Time in Basketball Players and Healthy Controls. National Journal of Integrated Research in Medicine* 3, 1 (2012), Aditya Jain, Ramta Bansal, Avnish Kumar, and K D Singh. 2015. *A comparative study of visual and auditory reaction times on the basis of gender and physical activity levels of medical first year students. International Journal of Applied and Basic Medical Research* 5, 2 (2015), 124, and Daniel V. McGehee, Elizabeth N. Mazzae, and G. H. Scott Baldwin. 2000. *Driver Reaction Time in Crash Avoidance Research: Validation of a Driving Simulator Study on a Test Track.* In *Proceedings of the Human Factors and Ergonomics Society Annual Meeting,* and it is difficult to keep the reaction time consistent, it is not difficult for G2Auth to detect such attacks. An attacker familiar with the target user can practice well to mimic the user better. We call such attacks as trained mimicry attacks and discuss them infra.

Attacks Out of Scope. The attacker may use a camera to record the user's waving operations and perform computer vision analysis. The analysis results are then fed into a robot to mimic the user, which we call robotic mimicry attacks. The mimicking involves reaction time, due to video analysis, data transmission, planning, and controlling actuators. According to our survey of state-of-the-art robotic techniques, robotic imitation of human actions is actively studied and still very limited. For example, NAO, one of the leading humanoid robots, is frequently used by researchers for imitation; despite its high price ($9,000), see RobotoLab. 2020. NAO V6 price is $9000. www.robotlab.com/store/nao-power-v6-educator-pack), it has a delay of 200 ms to execute a prescribed motion, see Sylvain Filiatrault and Ana-Maria Cretu. 2014. *Human arm motion imitation by a humanoid robot*. In 2014 IEEE International Symposium on Robotic and Sensors Environments (ROSE) Proceedings. IEEE, 31-36. Another study shows the end-to-end delay from human-waving to robot-waving is 1.72 seconds, see Gerard Canal, Sergio Escalera, and Cecilio Angulo. 2016. *A real-time human-robot interaction system based on gestures for assistive scenarios. Computer Vision and Image Understanding* 149 (2016), 65-77, much larger than human-to-human imitation. The large reaction time probably cannot be resolved in the near future. We thus do not consider robotic mimicry attacks in this work.

Figure 3:
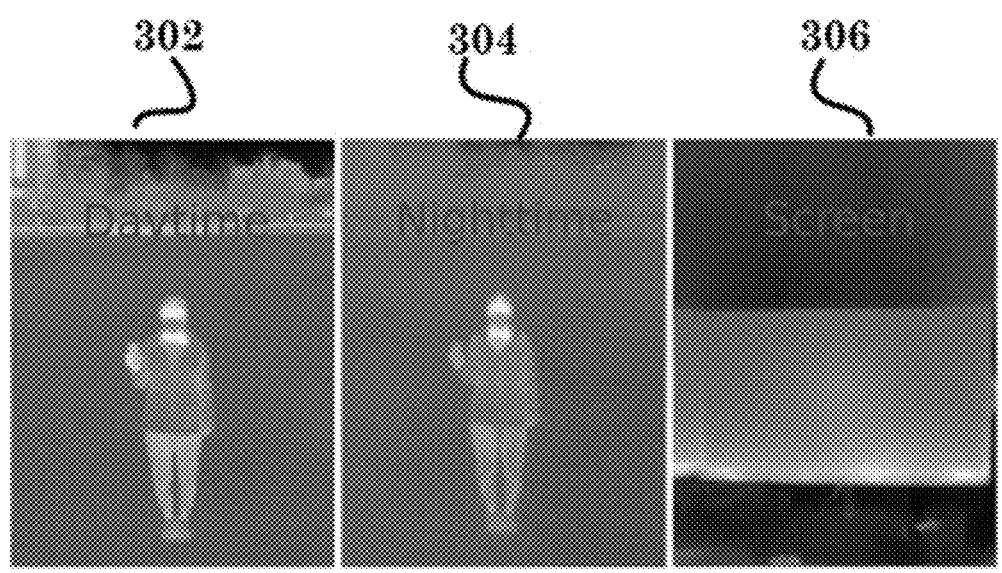
FIG. 3 shows thermal image photos.

The attacker may use a camera to record the user's waving operations and play the live video on a screen, which is used to fool the drone; we call this screen-based attacks. How to distinguish a live person from one on a screen is an important separate question, and there are many software-based anti-spoofing solutions, see Yaojie Liu, Amin Jourabloo, and Xiaoming Liu. 2018. *Learning deep models for face anti-spoofing: Binary or auxiliary supervision*. In *Proceedings of the IEEE conference on computer vision and pattern recognition*. 389-398, Di Wen, Hu Han, and Anil K Jain. 2015. *Face spoof detection with image distortion analysis. IEEE Transactions on Information Forensics and Security* 10, 4 (2015), 746-761, and Peng Zhang, Fuhao Zou, Zhiwen Wu, Nengli Dai, Skarpness Mark, Michael Fu, Juan Zhao, and Kai Li. 2019. *FeatherNets: Convolutional neural networks as light as feather for face anti-spoofing. In Proceedings of the IEEE Conference on Computer Vision and Pattern Recognition Workshops*. 0-0, and hardware-based solutions, such as using depth, multi-spectral, or thermal cameras, see Shifeng Zhang, Xiaobo Wang, Ajian Liu, Chenxu Zhao, Jun Wan, Sergio Escalera, Hailin Shi, Zezheng Wang, and Stan Z Li. 2019. *A dataset and benchmark for large-scale multi-modal face anti-spoofing. In Proceedings of the IEEE Conference on Computer Vision and Pattern Recognition*. 919-928. For example, as illustrated in FIG. 3, using a thermal camera (HTI-301) can easily distinguish live person during daytime 302 and/or nighttime 304 as well as distinguish from images displayed on a screen 306, because the screen does not generate infrared radiation like live persons. We assume one of the existing anti-spoofing solutions is used by delivery drones.

Radio jamming, see Aristides Mpitziopoulos, Damianos Gavalas, Charalampos Konstantopoulos, and Grammati Pantziou. 2009. *A survey on jamming attacks and countermeasures in WSNs. IEEE Communications Surveys & Tutorials* 11, 4 (2009), 42-56, can be used to launch denial-of-service attacks. Handling jamming is beyond the scope of this work.

The constraint of no human-drone contact and the threat of relay attacks impose challenges on authentication for drone delivery. We propose an approach that does not require human-drone contact and is resilient to relay attacks. Instead of deploying special hardware to impede attacks, our approach can be used by any users who have smartphones. Specifically, a user holding her smartphone waves her hand a few times to conduct authentication. When the user waves, the Inertial Measurement Unit (IMU) of her smartphone generates data, and the camera on the drone records video data, the drone recorded smartphone video. It is evident that the two kinds of data should correlate. Then, information that represents the waving operations, the waving operation information, is extracted from the two sides, and sent to each other via a key-protected communication channel. Finally, the two sides conduct comparison independently to perform mutual authentication. (Alternatively, assuming the delivery company's cloud server can be trusted, the computation can be offloaded to the server and the result is sent to the smartphone and the drone.)

We assume that the legitimate drone (that is, the drone sent by the intended courier company) and the legitimate user's smartphone are not compromised. If the company's cloud server is used to offload computation, we assume it is not compromised either. We assume the legitimate drone has a camera and a GPS receiver. We also assume the legitimate user's smart phone is installed with the courier company's app.

Each time a delivery task is assigned, a unique session key is (e.g., generated by the company's server and) distributed to both the legitimate drone and smartphone, such that the data can be transmitted over a key-protected channel, which is assumed in many existing approaches. The assumption is reasonable in that, in order to book a delivery service online (just like shopping online), anyway the app has to use a secure channel (usually TLS) to communicate with the company's server, which can send the session key to over that channel.

Assumptions. The current disclosure assumes that the drone D assigned by the courier company and the legitimate smartphone S can establish a key protected communication channel. There are multiple easy ways for the purpose. (1) Assuming the user has placed a delivery order securely on the courier company's TLS-protected website, the courier company's server generates a key and distributes it to both D and S. (2) The server can send the digital certificate of D to S; then, S and D negotiate a key upon handshaking. (3) The server can be used to bridge the communication between D and S. We assume D has a camera, a GPS or Bluetooth beacon receiver for navigation, and a wireless network adapter. The current disclosure also assumes that, when the drone hovers for authentication, it is easy for a user to identify its camera (e.g., many cameras have a circle of LED lights around them) and stand in front of it. We further assume S has installed with the courier company's app.

Authentication Procedure (1) After the drone arrives at the designated location, such as a designated pick up spot or location for the drone delivery, it hovers and establishes a key-protected communication channel with legitimate user phone 204 of the user. Then, legitimate drone 208 and legitimate user phone 204 both synchronize with an NTP (Network Time Protocol) server to establish and run a clock synchronization protocol. See, Saurabh Ganeriwal, Ram Kumar, and Mani B Srivastava. 2003. *Timing-sync protocol for sensor networks. In Proceedings of the 1st international conference on Embedded networked sensor systems.*

Next, legitimate user phone 204 notifies the user of the delivery drone's arrival.

(2) The user then walks towards the designated location (like using Uber) and unlocks legitimate user phone 204 to confirm the notification. Holding legitimate user phone 204 and facing the hovering drone (note a drone generates quite some noises and is thus easy to identify), she waves her hand.

(3) Legitimate drone 208 searches for a user waving her hand through computer vision analysis. Once legitimate drone 208 finds the user, it notifies legitimate user phone 204 and starts recording a video, while legitimate user phone 204 generates a vibration to have the user informed and starts collecting IMU data. After legitimate user phone 204 collects data of waving operations, it generates another vibration to inform the user of the completion of waving.

(4) Legitimate user phone 204 and legitimate drone 208 extract information and exchange it to conduct mutual authentication. If this is a success, once the mutual authentication is concluded, the package delivery proceeds; otherwise, it goes back to Step 3, until legitimate drone 208 reaches the maximum number/time of attempts.

It is worth highlighting that, given a drone-delivery task that involves the target user's smartphone S and the designated drone D, the authentication compares the data recorded by S and D meaning that it is a 1-to-1 verification problem, not a 1-to-n identification problem. Its accuracy does not degrade as the user base grows.

Multiple Drones and Persons

Multiple drones. If a malicious drone D' (or just another delivery drone) hovers near D, it is difficult for the user to decide which is the correct one. Note that even if distance bounding [10] is used, the same issue can arise. Nevertheless, trivial countermeasures can be used to defeat/reveal the attacks. For example, assuming that the multiple drones are not hovering in a vertical line (if yes, the legitimate drone can make a horizontal move slightly; other drones, if they closely follow it, are malicious), D can then generate a notification asking the user to stand right under one of the drones. D then notify the user whether she is under the legitimate drone.

Multiple Persons and Light Sources.

There may be people waving hands in the background. As detailed infra, the current disclosure uses a simple but robust method to discard waving in the background: only waving that spans over a threshold portion of the drone's view is considered. Note that even if light sources in the background (e.g., a light swinging due to wind) is considered for comparison, it still needs to pass the correlation calculation, see infra. In the rare case where multiple persons dispute over a delivery drone, again the trivial countermeasure described above can be used.

Correlation Study

IMU data collected by a smartphone and video data collected by a drone are heterogeneous. How to compare the two kinds of data for computing the correlation score is a question. Second, different people may wave in different ways. Is the correlation computation approach robust?

Comparing Heterogeneous Data

When a user waves, the held smartphone's IMU generates a sequence of acceleration and gyroscope data, and the drone's camera records the trajectory of the smartphone (note that a video contains multiple frames per second; e.g., fps=60).

Failed attempt. To compare the two kinds of data, we first considered this approach: inferring the waving trajectory from IMU data and then comparing it with the trajectory recorded by the video. But fine-grained trajectory inference based on inertial sensor data from smartphones is still an open question, see Sheng Shen, Mahanth Gowda, and Romit Roy Choudhury. 2018. *Closing the Gaps in Inertial Motion Tracking*. In Proceedings of the 24th Annual International Conference on Mobile Computing and Networking (MobiCom), Sheng Shen, He Wang, and Romit Roy Choudhury. 2016. *I Am a Smartwatch and I Can Track My User's Arm*. In Proceedings of the 14th Annual International Conference on Mobile Systems, Applications, and Services (MobiSys), Sangki Yun, Yi-Chao Chen, and Lili Qiu. 2015. *Turning a Mobile Device into a Mouse in the Air*. In Proceedings of the 13th Annual International Conference on Mobile Systems, Applications, and Services (MobiSys), and Pengfei Zhou, Mo Li, and Guobin Shen. 2014. *Use It Free: Instantly Knowing Your Phone Attitude. In Proceedings of the 20th Annual International Conference on Mobile Computing and Networking (MobiCom)*, as gravity has an impact on the accuracy of orientation projection and double integration of the acceleration gets worse over time.

Comparing acceleration. Our observation is that based on video frames, acceleration can be calculated from the smartphone's displacement, as the former is the second derivative of the latter. On the side of smartphone, its IMU directly generates acceleration data. Thus, the acceleration data can be the basis of comparison. But the acceleration data still cannot be compared directly for two reasons.

First, the units are different, as the unit for acceleration on the smartphone side is $m/s^2$, while that on the drone side pixel/$s^2$. To resolve it, we normalize the data between −1 and 1, such that they can be compared in a uniform scale.

Figure 4:
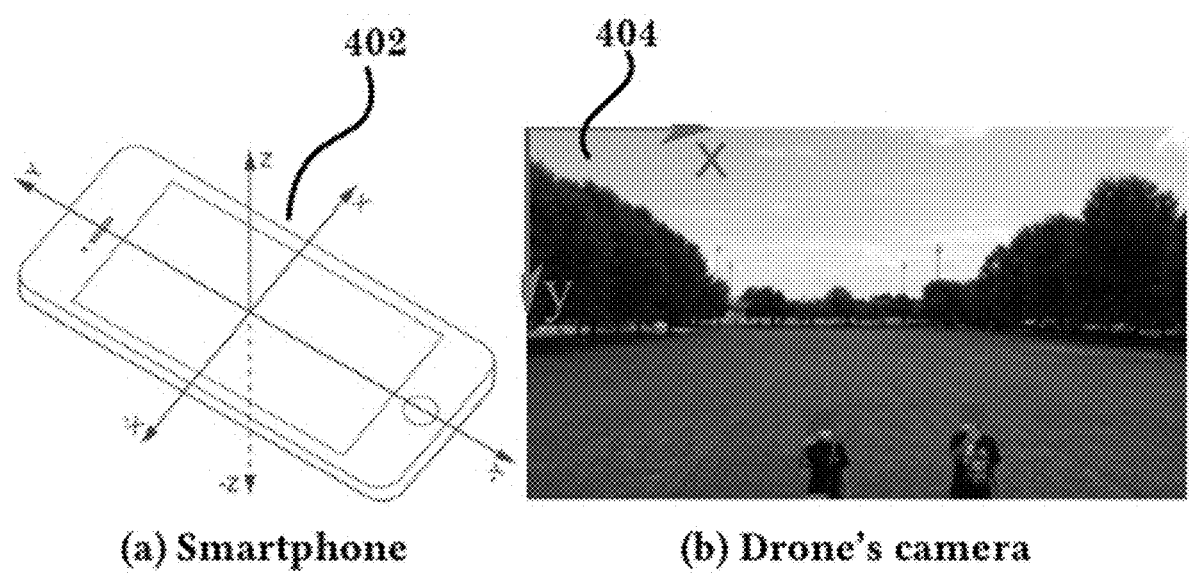
FIG. 4 shows potential coordinate systems of the current disclosure.

Second, as illustrated in FIG. 4, the two sides, user phone coordinate system 402 and drone coordinate system 404 use different Cartesian coordinate systems. The coordinate system of the accelerator in a smartphone is relative to the smartphone itself, which means that when the smartphone is waved, the three axes may change relatively to the earth. On the drone's side, it hovers in front of a user to record waving operations; we define the axis along the width of a video frame as the x-axis and the one along the height as the y-axis. If a smartphone is held vertically and right in front of the drone, the two coordinate systems align well. However, it is not realistic to expect all users wave phones that way. Thus, it is important to examine whether data correlation exists, regardless of how a phone is waved. To that end, we perform empirical studies to examine the robustness of correlation.

Robustness of Correlation

The current disclosure first assumes that a user holds her smartphone vertically and waves her smartphone horizontally (we will show that this assumption is not necessary). Our observation is that, when the user changes the waving direction (e.g., from left to right), the IMU-collected acceleration value along the x-axis reaches either its peak or valley. (We do not make assumptions on how the two coordinate systems define "positive" and "negative", as we use the absolute value of the correlation measurement.) Generally, we hypothesize that, regardless of the posture of the held smartphone and the waving trajectory, along at least one of the three axes in the smartphone's coordinate system, the IMU-collected acceleration value will reach its peak or valley as the waving direction changes, since it is unlikely that the accelerometer does not sense the direction change along any axis.

To verify this hypothesis, we designed an empirical study. We decompose an waving operation into two aspects: (1) Holding posture: how a user holds her phone in hand; we consider three postures in the study: vertical, diagonal, and horizontal, as shown in the three photos on the left of FIG. 5; (2) Waving direction: how a user waves her phone; we consider three directions: "left-right", "diagonal", and "updown".

Participants then enumerate all combinations of the two aspects (totaling nine) to wave smartphones. Note that during testing of our system, users are not limited to the nine waving styles, as long as the user does not wave the phone "forward-backward", since "forward-backward" waving would cause little displacement from the view of the drone's camera.

Figure 5:
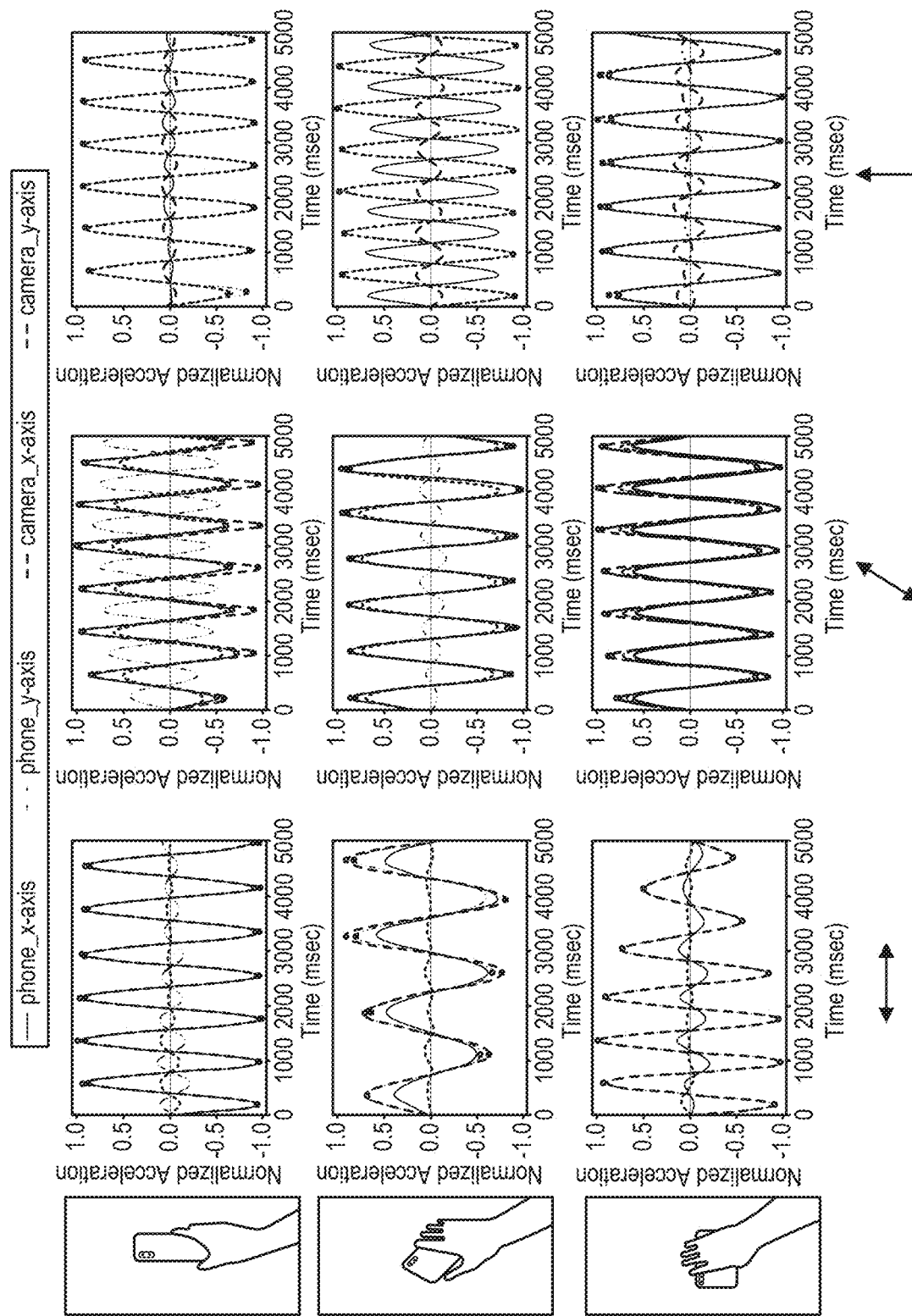
FIG. 5 shows a correlation study of the present disclosure.

After data preprocessing, for each of the nine combinations, we plot the acceleration data from the two sides (smartphone and drone). For example, the sub-figure in the upper left corner of FIG. 5 is based on the waving operations when a user holds the phone vertically and waves it "left-right" (i.e., waving it horizontally). It shows that the IMU's acceleration data along the x-axis (denoted as a solid red line) correlate well with the acceleration data derived from the video. This correlation exists consistently across all the nine combinations, although the correlated axes vary. (Depending on the waving operations, the IMU-collected acceleration data along the z-axis may also correlate with the direction changes well; to make the illustrations clear, we did not include the data.)

We then vary the waving speed, the waving trajectory by using an "arc" motion (i.e., elbows or shoulders as the points of rotation), and involve 20 participants of different genders and ages ranging from 18 to 67, and the correlation always exists along at least one axis. The axis whose data shows the largest peak-valley changes during waving is called the primary axis. This applies to both the IMU and video-derived acceleration data. Based on the empirical studies, we conclude that the IMU-collected acceleration data along the primary axis correlate well with the video-derived acceleration data along its primary axis.

Data Preprocessing

We discuss how to extract acceleration and preprocess data. The output is two sequences of normalized acceleration data, one from IMU and the other from a video.

Obtaining Trajectory from Video

Given a video recording a user's waving, we need to obtain the waving trajectory. To that end, we first tried to locate the smartphone being waved and employ object tracking to track its movement. But G2Auth records videos from a secure distance (≥5 m) away from users, see infra, making the smartphone a small object. While both object detection and object tracking are actively studied and many solutions have been proposed, see Martin Danelljan, Goutam Bhat, Fahad Shahbaz Khan, and Michael Felsberg. 2019. *Atom: Accurate tracking by overlap maximization. In Proceedings of the IEEE Conference on Computer Vision and Pattern Recognition.* 4660-4669, Martin Danelljan, Goutam Bhat, Fahad Shahbaz Khan, and Michael Felsberg. 2017. *Eco: Efficient convolution operators for tracking. In Proceedings of the IEEE conference on computer vision and pattern recognition.* 6638-6646, and Jianan Li, Xiaodan Liang, Yunchao Wei, Tingfa Xu, Jiashi Feng, and Shuicheng Yan. 2017. *Perceptual generative adversarial networks for small object detection. In Proceedings of the IEEE conference on computer vision and pattern recognition.* 1222-1230, accurately detecting and tracking small objects are still open questions, see Dawei Du, Yuankai Qi, Hongyang Yu, Yifan Yang, Kaiwen Duan, Guorong Li, Weigang Zhang, Qingming Huang, and Qi Tian. 2018. *The unmanned aerial vehicle benchmark: Object detection and tracking. In Proceedings of the European Conference on Computer Vision (ECCV).* 370-386.

Figure 6:
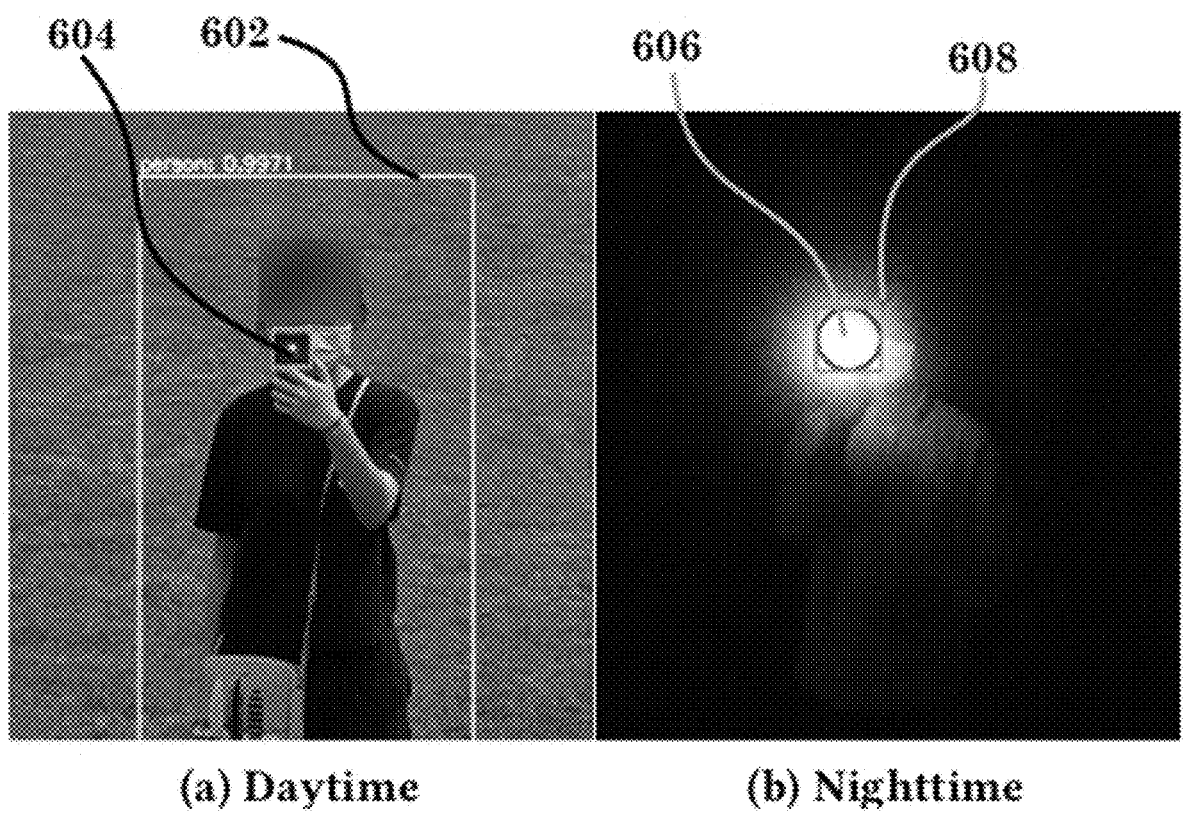
FIG. 6 shows sample images taken via the current disclosure.

We propose a two-step solution: (1) Our system first performs person detection, which can be made very accurate. In this step, we use YOLO_V3, one of the fastest and most accurate object detection algorithms, see Joseph Redmon and Ali Farhadi. 2018. *Yolov3: An incremental improvement. arXiv preprint arXiv:1804.02767* (2018). (2) G2Auth's mobile app installed on the user's smartphone automatically keeps the flashlight on during waving. (G2Auth requires the smartphone's back to face the drone during waving; our mobile app generates an alert if it is not held this way.) Plus, since a drone makes quite some noise, the user can easily identify it and face it when waving. As shown in FIG. 6 at (a), within the bounding box 602 for the detected hand-waving person, our system searches for a small bright area 604 (using contour detection, see Pablo Arbelaez, Michael Maire, Charless Fowlkes, and Jitendra Malik. 2010. *Contour detection and hierarchical image segmentation. IEEE transactions on pattern analysis and machine intelligence* 33, 5 (2010), 898-916) to locate the possible positions of the flashlight; this step may locate multiple small bright areas, which usually do not show the waving movements and thus can be excluded easily.

During the daytime, person identification in Step (1) is necessary as there may exist many small bright areas (like a cloud, metal and glass), and we can use the bounding box output by person detection to narrow down our search. During the nighttime, person detection is not needed, since the flashlight distinguishes itself from the surroundings, as shown by FIG. 6 at (b).

Once the flashlight is located, we start object tracking with a square bounding box 608 covering the flashlight, as shown in FIG. 6 at (b). It is interesting to note that we are not tracking the smartphone: a phone may be partially covered by the user's hand and have a color similar to the user's clothes or background, leading to tracking failures. Instead, we are tracking a flashlight, which has salient features. We apply a state-of-the-art small object tracker, PrDiMP, see Martin Danelljan, Luc Van Gool, and Radu Timofte. 2020. *Probabilistic regression for visual tracking. In Proceedings of the IEEE/CVF Conference on Computer Vision and Pattern Recognition.* 7183-7192, which achieves the best performance in the UAV123 dataset, see Id., containing many small and fast moving objects. The output of object tracking is the trajectory of the smartphone.

In short, while small object detection and tracking are still challenging problems in general, we exploit the uniqueness of our authentication procedure (i.e., waving) and the hardware capability (i.e., flashlight) to deliver a robust solution.

Preprocessing Trajectory and IMU Data

Figure 7:
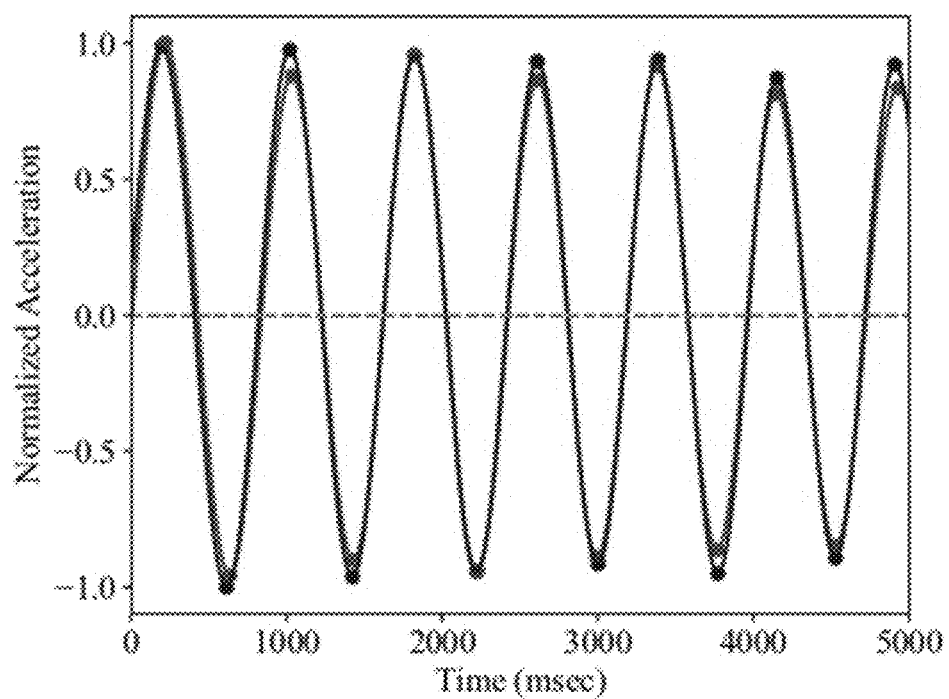
FIG. 7 shows preprocessed data from a phone and drone.

The trajectory data output by object tracking may fluctuate and contain noises, and so do the acceleration data collected by IMU. We thus perform the following preprocessing: (1) Linear interpolation: gaps in the data due to uneven sampling can be filled. (2) A Low-pass Butterworth filter, see Ivan W Selesnick and C Sidney Burrus. 1998. *Generalized digital Butterworth filter design. IEEE Transactions on signal processing* 46, 6 (1998), 1688-1694, with a cutoff frequency of 3 Hz is used to filter out noises. The frequency of waving is less than 3 Hz, so this does not harm critical information about waving; the noise caused by vibrations of human body has a frequency greater than 3 Hz, see Wu Ren, Bo Peng, Jiefen Shen, Yang Li, and Yi Yu. 2018. *Study on vibration characteristics and human riding comfort of a special equipment cab. Journal of Sensors* 2018 (2018), and can be removed. (3) After the trajectory is preprocessed, we get the acceleration value at any moment by computing the second derivative of displacement. (4) Given the two sequences of acceleration data that have different physical units ($m/s^2$ from IMU and $pixel/s^2$ from video), to make them comparable, we normalize the data of each sequence in the range of (-1, 1], as shown in FIG. 7.

Correlation Calculation

After getting the two sequences of normalized acceleration data, we check whether the two sequences correlate with each other, in order to determine whether the authentication is a success or not.

We consider two methods. The first uses Pearson correlation coefficient (PCC), see Jacob Benesty, Jingdong Chen, Yiteng Huang, and Israel Cohen. 2009. *Pearson correlation coefficient. In Noise reduction in speech processing.* Springer, 1-4, one of the most widely used algorithms for calculating the correlation of two sequences. We use its absolute value as the correlation score, as the two coordinate systems (the smartphone's and drone's) may have opposite definitions about "positive" and "negative." This method then uses thresholding to determine whether the authentication is a success.

The second method is based on machine learning. We use the correlation score as one of the multiple features. To extract features from two sequences of acceleration data, we first define critical events as the peaks and valleys in the curve of the acceleration data, and obtain the timestamps of these events, as shown in FIG. 7. Our insight is that the two sequences of critical events should align well in terms of their occurrence time. E.g., an attacker may happen to "hit" some timestamps of critical events, but the variance of time difference between critical events from the two sides tends to be high. Given the timestamp sequence on the smartphone side $S_P = \{t_P^{(1)}, t_P^{(2)}, \ldots, t_P^{(m)}\}^-$, and that on the drone side $S_D = \{t_D^{(1)}, t_D^{(2)}, \ldots {}^-t_D^{(m)}\}$, we generate the following features (in addition to the correlation score): (1) Time difference values: for each $t_P$ in $S_P$, we find a $T_D$ in $S_D$ that is closest to $t_P$, and calculate the difference between $t_P$ and $t_D$; (2) Noncorrelated event number: the number of extra $T_D$ in two consecutive timestamps in $S_P$; (3) Standard deviation: standard deviation of the time difference values; (4) MAD: median absolute deviation of the time difference values; (5) Modified z-score: modified z-score of the time difference values.

Regarding the classifier, we consider three: support vector machine (SVM), k-Nearest Neighbors (kNN), and Random Forest (RF). Our final design chooses the second method and adopts SVM because of its best performance.

Data Collection

To evaluate the system we collected multiple datasets. We recruited 20 participants, our study of "Training Dataset Size" shows why 20 participants are sufficient. Plus, the number of participants is larger than or equal to that in other correlation-based authentication work whose ages range from 18 to 67, 10 males and 10 females, including undergraduates, graduates, faculty members, janitors, and retired people, in our experiments. The research was conducted under an IRB approval and followed the CDC guidance about COVID-19 (e.g., wearing masks and using hand sanitizer).

Devices

Figure 8:
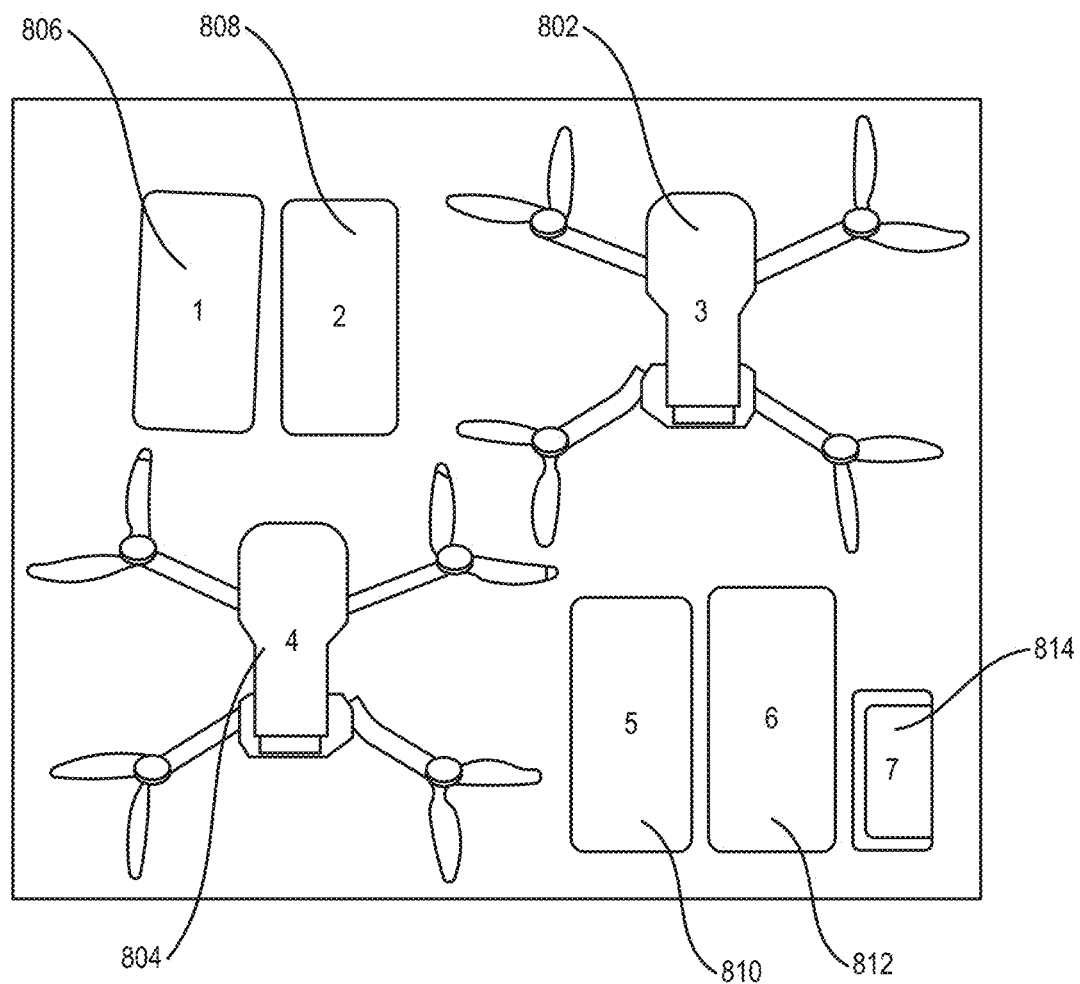
FIG. 8 shows one experimental setup of the current disclosure.

FIG. 8 shows the devices used in our experiments, including two DJI Mavic Mini drones $D_1$ 802 and $D_2$ 804 and five smartphones Nexus 5X 806, LG K8 808, iPhone 11 810, Honor View 812, and Unihertz Atom 814. The DJI Mavic Mini drone is positioned as a beginner camera drone. We use the built-in camera of each DJI Mavic Mini drone to capture users' hand movements. The camera resolution of one drone is set to 2.7 K at 30 FPS, and that of the other is set to 1080 P (1920×1080) at 60 FPS. system performance.) We use Nexus 5X 806 and LG K8 808 to collect data for building Dataset I and Dataset II. The other smartphones (i.e., iPhone 11 810, Honor View 10 812, and Unihertz Atom 814) are used for the parameter study.

Dataset I for Accuracy Evaluation

Experimental setting. To build Dataset I, we use both Nexus 5X 806 and LG K8 smartphone 808. We randomly and equally assign the two phones to the participates (i.e., 10 participants uses Nexus 5X 806 and another 10 the LG K8 808). We deploy two drones 802 and 804 to record each participant's hand motions simultaneously.

The drones 802 and 804 hover next to each other, and we set their height to 4 meters.

We ask each participant to stand 5 meters (horizontal distance) away from the drones. Each participant holds a smartphone and performs the authentication operations in front of the drones, for 30 times. The participants are allowed to wave the smartphone in a way most comfortable to them using their dominant hand.

Positive pairs. When a participant performs the authentication operations in front of the drones, we collect one positive data pair for each drone: one is the acceleration data from the smartphone, and the other a video captured by this drone. For each drone, we collect 600 (=20×30) positive pairs, each with a label=1.

Negative pairs. Assuming two users, $\mu_1$ and $\mu_2$, authenticate to the drones $D_1$ 802 and $D_2$ 804 2, respectively, the accelerometer data $S_{P1}$ from $\mu_1$'s smartphone and the video $S_{D2}$ captured by $D_2$ constitute a negative pair; also, the accelerometer data $S_{P2}$ from $\mu 2$'s smartphone and the video $S_{D1}$ captured by $D_1$ constitute another negative pair.

To build such an uncorrelated sample, we perform time alignment for each pair of authentications, randomly selected from two users, such that the authentications can be considered as starting nearly at the same time. Studies have demonstrated that, even for athletes, the best audio/visual reaction time of human is greater than 50 ms (generally between 100-300 ms), we shift the timestamps of $S_{P1}$ to make the starting time difference between $S_{P1}$ and $S_{D2}$ within the range of (−300, −50)ms or (50, 300)ms. The same time alignment is also performed for $SP_2$ and $S_{D1}$. We finally generate 600 negative pairs, each with a label s=0.

Dataset II for Security Evaluation

Experimental setting. To build Dataset II, we divide the 20 participants used in collecting Dataset I into two parts: 10 act as victims and the others 10 as attackers; one victim and one attacker form a pair. Thus, there are 10 pairs of victims and attackers. We consider two types of mimicry attacks (MA), MA-untrained and MA-trained, as discussed herein.

We provide the attacker $\mathcal{A}$ with a clear view of the victim V's hand movements, by letting $\mathcal{A}$ stand next to V (1 meter away). We use the same drone to capture their waving operations together. The camera resolution of the drone is set to 2.7K at 30 FPS, and its height is set to 4 meters. $\mathcal{A}$ and V are 5 meters (horizontal distance) away from the drone (=5).

MA-untrained. We tell them the purpose of this experiment: an attacker mimics the victim's hand movements to fool our system, and explain how our system works. We ask the victim to perform authentication operations and the attacker to launch the mimicry attack simultaneously. Each pair of attacker and victim performs authentication operations, with and without pauses, for 15 times. Here, a pause means the users pauses the waving intentionally prior to changing the waving direction.

For each authentication, we construct a data pair consisting of $S_{PV}$ and $S_{DA}$, where $S_{PV}$ is the acceleration data from V's smartphone and $S_{DA}$ is the video captured for $\mathcal{A}$'s hand movements. We collect 150 (=10×15) pairs for the authentication operations without pauses, and the same number of pairs for the authentication operations with pauses.

MA-trained. We first ask each victim to perform authentication in front of the drone for 5 times, and record a video of each authentication. Each attacker is trained by watching videos as many times as needed. The attacker only needs to learn one victim's actions and launch attacks against that victim. During training, we provide the attackers with feedback on the differences between their hand movements and the victims', so that they can adapt their operations.

After the attacker feels confident enough, the victim performs authentication operations and the attacker launches the mimicry attack simultaneously. Their hand movements are recorded by the drone's camera, at the same time. Similar to MA-untrained, each pair of attacker and victim performs the authentication operations with and without pauses for 15 times. We collect 150 (=10×15) pairs for the authentication operations without pauses, and the same number of pairs for the authentication operations with pauses.

Evaluation

Metrics. We use False Rejection Rate (FRR) and False Acceptance Rate (FAR) to evaluate the performance of G2Auth. A lower FRR indicates that the system makes fewer mistakes for authorized users, resulting in better usability. On the other hand, a lower FAR indicates better effectiveness of the system in preventing adversaries from gaining access. We also report Equal Error Rate (EER) and Area Under the Curve (AUC) of Receiver Operating Characteristics (ROC) curve: EER reports FRR (FAR) when FRR=FAR, while AUC provides an aggregate measure of performance across all possible thresholds, see Shridatt Sugrim, Can Liu, Meghan McLean, and Janne Lindqvist. 2019. *Robust Performance Metrics for Authentication Systems*. In *NDSS*.

Authentication Accuracy

We use Dataset I to test the accuracy of G2Auth. Similar to many previous works on evaluating authentication systems, see Michael Esterman, Benjamin J Tamber-Rosenau, Yu-Chin Chiu, and Steven Yantis. 2010. *Avoiding non-independence in fMRI data analysis: leave one subject out*. Neuroimage 50, 2 (2010), 572-576, and Xiaopeng Li, Fengyao Yan, Fei Zuo, Qiang Zeng, and Lannan Luo. 2019. *Touch Well Before Use: Intuitive and Secure Authentication for IoT Devices*. In *The 25th Annual International Conference on Mobile Computing and Networking (MobiCom)*. 1-17, we adopt a strict mechanism, Leave-One-Subject-Out (LOSO), to obtain the average performance over all subjects. In LOSO, we iteratively choose one subject for testing and use the data of the other 19 subjects to train the system. We compute the average performance over all the subjects. Through this, we can examine whether our system is user agnostic—whether it can work for users never seen during training. We present the results using the data for the drone whose resolution is set to 2.7K at 30 FPS. We choose the number of waving operations as 8.

In our system design, if the tracking algorithm fails to track the phone, we ask the user to re-authenticate, instead of moving forward to the next step of data correlation calculation. Thus, failure of tracking has an impact on the system's FRR, but no impact on the system's FAR. We define $FRR_{SYS}$ as the system's FRR, which consists of two parts: $FRR_t$ and $FRR_c$. $FRR_t$ is the failure rate of the tracking algorithm, and $FRR_c$ is the FRR of the system excluding the tracking algorithm. We thus have: $FRR_{SYS}=1-(1-FRR_t)\times(1-FRR_c)$.

When the flashlight is turned on, the tracking algorithm we adopted, PrDiMP, see Martin Danelljan, Luc Van Gool, and Radu Timofte. 2020. *Probabilistic regression for visual tracking*. In *Proceedings of the IEEE/CVF Conference on Computer Vision and Pattern Recognition*. 7183-7192, can achieve a success rate 0.98 (=$FRR_t$ 0.02) for the daytime and a success rate 1.0 ($FRR_t$=0) for the nighttime. (When the flashlight is turned off, $FRR_t$=0.20 for the daytime and $FRR_t$=0.74 for the nighttime.) In the following we refer to $FRR_c$ as FRR, unless otherwise stated.

To evaluate the system performance on data with pauses, we apply the model trained using Dataset-I, which only contains data without pauses, to test the data with pauses. Specifically, we ask 10 participants to perform authentication operations with random pauses for 15 times, and use the model trained using Dataset I to test the new collected data.

Figure 9:
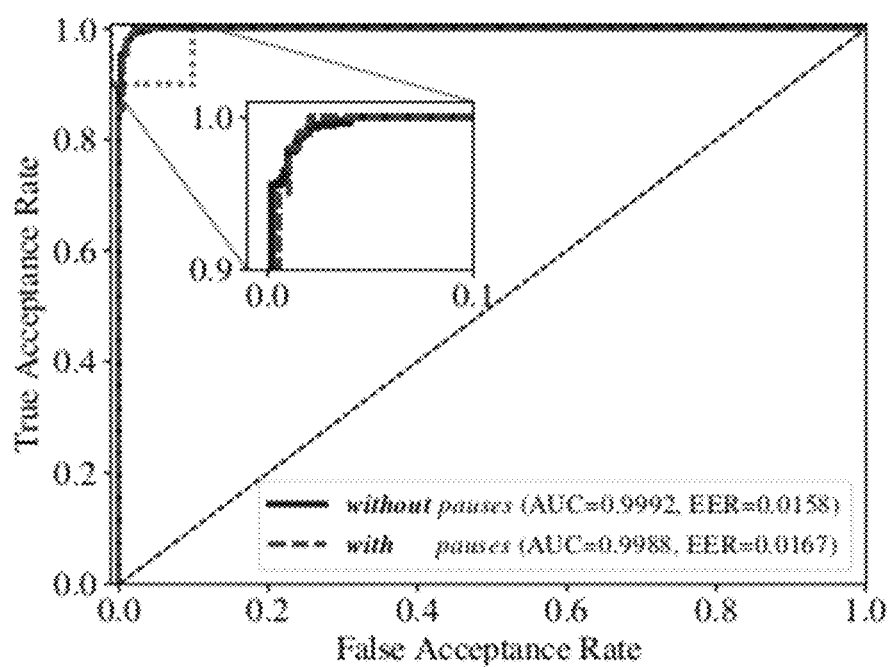
FIG. 9 shows ROC curves, AUC and EER.

FIG. 9 shows the ROC curves for experiments with and without pauses. For the data without pauses, we can see that our system achieves an average EER=FRR=FAR=0.0158 and AUC=0.9992. The low EER indicates that G2Auth can distinguish authorized accesses from unauthorized ones with a high accuracy (=1−EER) of 0.9842. (When only PCC is used, that is, the first method described in Section 6, EER=0.0283.) For data with pauses, G2Auth achieves EER=0.0167 and AUC=0.9988. Thus, the model trained using the data without pauses can be directly applied to testing data with pauses and achieve a high accuracy, indicating that the high correlation exists regardless of pauses.

We analyse the very few false rejection cases and find that they are mainly caused by the inaccuracy of tracking. For example, there are cases when the sunlight passing through the leaves form small bright spots that look similar to the flashlight (see Object Tracking Algorithm in Section, infra). In the second attempt, the drone can actively turn around and successfully finish the authentication. Our current prototype uses a simple method for clock synchronization. See, Saurabh Ganeriwal, Ram Kumar, and Mani B Srivastava. 2003. *Timing-sync protocol for sensor networks*. In *Proceedings of the 1st international conference on Embedded networked sensor systems*. The resulting clock difference, measured using the method, see Jeremy Elson, Lewis Girod, and Deborah Estrin. 2002. *Fine-Grained Network Time Synchronization Using Reference Broadcasts*. In *5th Symposium on Operating Systems Design and Implementation (OSDI)*, is 1.7 ms (±0.9 ms). This is much shorter than the average human reaction time>200 ms. See, T. P. Ghuntla, H. B. Mehta, P. A. Gokhale, and C. J. Shah. 2012. *A Comparative Study of Visual Reaction Time in Basketball Players and Healthy Controls*. National Journal of Integrated Research in Medicine 3, 1 (2012), Aditya Jain, Ramta Bansal, Avnish Kumar, and K. D. Singh. 2015. *A comparative study of visual and auditory reaction times on the basis of gender and physical activity levels of medical first year students*. International Journal of Applied & Basic Medical Research 5, 2 (2015), and Daniel V. McGehee, Elizabeth N. Mazzae, and G. H. Scott Baldwin. 2000. *Driver Reaction Time in Crash Avoidance Research: Validation of a Driving Simulator Study on a Test Track*. In *Proceedings of the Human Factors and Ergonomics Society Annual Meeting*.

Resilience to Mimicry Attacks

This section evaluates the resilience of G2Auth (based on the threshold selected infra that achieves EER=0.0158) to mimicry attacks. We use Dataset II in this experiment, where 10 participants act as victims and the other 10 as attackers.

Resilience to MA-untrained. Without pauses introduced during authentication, G2Auth can successfully identify 91% (=1−FAR=1−0.09) of the attacks, on average. The performance can be greatly improved if pauses are added—on average, 98% (=1−FAR=1−0.02) of the attacks can be identified by G2Auth. The results demonstrate that pauses during authentication can increase the difficulty for attackers in mimicking the victims' hand movements. Thus, the authentication operations with pauses are more secure.

Resilience to MA-trained. Under MA-trained attacks, the attackers' success rate increases sharply—G2Auth can only identify 74% (=1−FAR=1−0.26) of attacks on average, which revels a weakness of authentication without pauses, under trained attacks. To enhance the resilience to MAtrained, G2Auth requires that users to intentionally add at least one pause. This is enforced automatically by checking whether the acceleration reaches zero for a short time. All the participants successfully followed the instructions by adding at least one pause in each authentication procedure, which indicates that adding random pauses is not a problem to the users.

Then, the attackers' success rate is reduced from 0.26 to 0.04—G2Auth can successfully identify 96% (=1−FAR=1−0.04) of attacks, on average. Thus, the pauses decreases the attackers' success rate by making the waving operations more unpredictable and difficult to mimic.

More Pauses. When collecting data with pauses, users were free to decide the number of pauses (but at least one) to be added. We then investigate how the number of pauses affects the attacker's success rate. We find that when three (3) or more pauses are added, the FAR under MA-trained attacks becomes zero, while FRR is below 0.019. Thus, to achieve high security, a delivery company can enforce the number of pauses≥3.

Parameter Study

Object Tracking Algorithm. G2Auth needs to track smartphones through computer vision analysis. There has been much research on object tracking. This experiment evaluates some state-of-the art algorithms, including CSRT, see Alan Lukezic, Tomas Vojir, Luka ˇCehovin Zajc, Jiri Matas, and Matej Kristan 2017. *Discriminative correlation filter with channel and spatial reliability. In Proceedings of the IEEE Conference on Computer Vision and Pattern Recognition* (CVPR), see ECO Martin Danelljan, Goutam Bhat, Fahad Shahbaz Khan, and Michael Felsberg. 2017. Eco: *Efficient convolution operators for tracking. In Proceedings of the IEEE conference on computer vision and pattern recognition (CVPR)*, see RT-MDNet Ilchae Jung, Jeany Son, Mooyeol Baek, and Bohyung Han. 2018. *Real-Time MDNet. In European Conference on Computer Vision (ECCV)*, ATOM Martin Danelljan, Goutam Bhat, Fahad Shahbaz Khan, and Michael Felsberg. 2019. *Atom: Accurate tracking by overlap maximization. In Proceedings of the IEEE Conference on Computer Vision and Pattern Recognition* (CVPR). see DiMP Goutam Bhat, Martin Danelljan, Luc Van Gool, and Radu Timofte. 2019. *Learning discriminative model prediction for tracking. In Proceedings of the IEEE International Conference on Computer Vision (ICCV)*, see PrDiMP Martin Danelljan, Luc Van Gool, and Radu Timofte. 2020. *Probabilistic regression for visual tracking. In Proceedings of the IEEE/CVF Conference on Computer Vision and Pattern Recognition (CVPR)*.

To evaluate the tracking success rates, we manually check the bounding box during tracking with 600 videos about phone waving (e.g., whether it instead tracks an object in the background). The results in Table 3, see FIG. 12, shows that the tracking success rate gets improved greatly for all the algorithms when the flashlight is turned on, especially in nighttime. We choose PrDiMP for its high performance; its failed cases share a common feature—they have bright spots in the background, e.g., mottled sunlight through tree leaves. Therefore, we suggest users avoid authenticating under such background.

Classifier. We train the model with different classifiers, including SVM, kNN and Random Forest. For SVM, we examine the linear, polynomial and radial basis function (RBF) kernels, and finally adopt RBF; after grid search, we set the optimal hyperparameter, c as 20 and γ as 0.01, for SVM. For kNN, we test different values of k, ranging from 1 to 20, and choose 3 as the optimal value. For Random Forest, we test different number of trees, ranging from 50 to 200, and select the optimal value as 120. The results ($EER_{SVM}$=0.016, $EER_{RF}$=0.018, $EER_{kNN}$=0.021) show that SVM has the lowest EER.

Figure 10A:
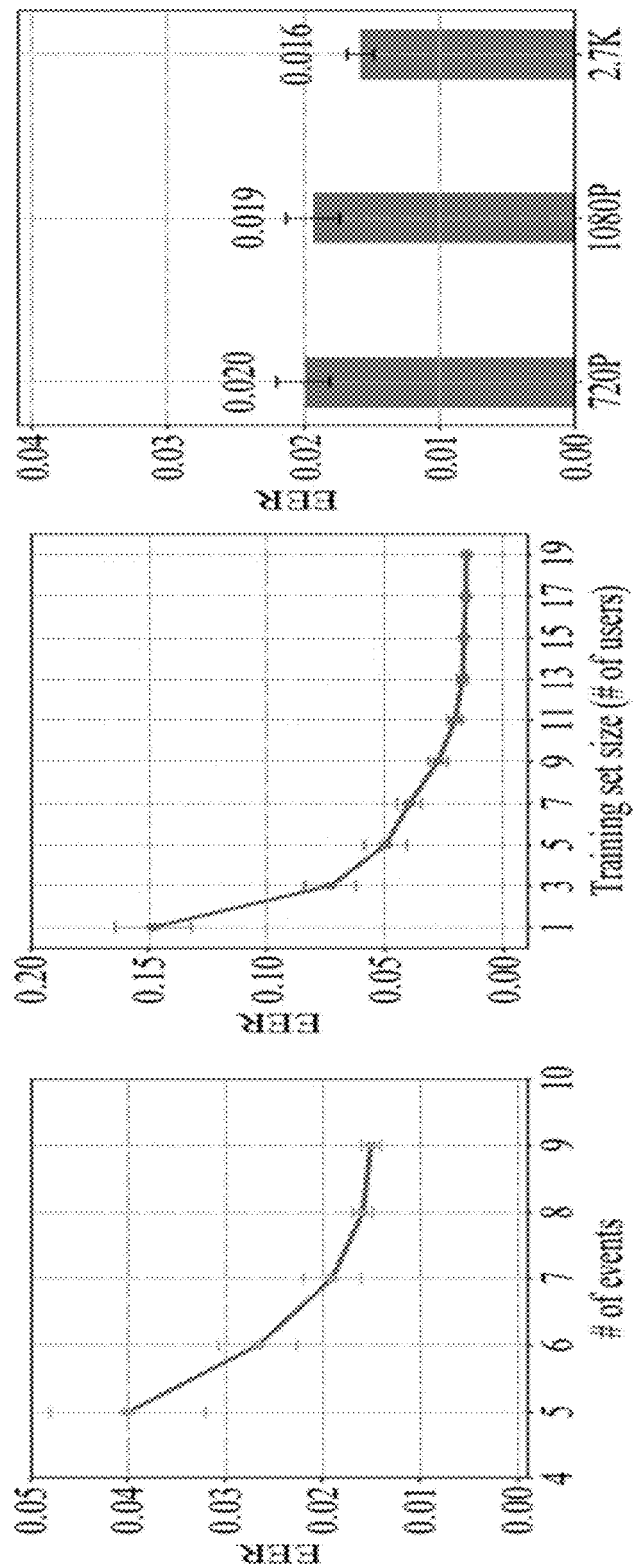
FIG. 10A shows impact of parameters and experimental settings.

Number of Waving Events. More events provide better security but also require longer time to authenticate, which harms usability. FIG. 10A at (a) shows the EER with varying number of events. As expected, EER decreases as the number of events increases. We chose eight, considering both security and usability. But it can be configured based on the demand. For instance, if usability has a higher weight, then choosing a lesser number of events, e.g., six, is appropriate.

Training Dataset Size. We evaluate the impact of training dataset size on the system performance. The training dataset size is defined as the number of participants for training, denoted as, whose samples are used for training. We train G2Auth with (1≤m≤19 with a step of 2) participants' data and test it with the data of the rest of the participants (20−m). FIG. 9(*b*) shows the results. It can be seen that the accuracy of the classifiers converges, given m≥15.

Camera Resolution. By down sampling the resolution of 2.7K (2720×1530), we get different camera data with a resolution of 1080P (1920×1080) and 720P (1280×720). We then evaluate the system performance in terms of different camera resolutions. As shown in FIG. 10A at (c), the higher the resolution, the better performance (the lower EER) of G2Auth. Even with a low resolution (i.e., 720P), G2Auth can still achieve a satisfactory accuracy (EER=0.02).

Camera FPS. To measure the impact of FPS, we use the data captured by the DJI Mavic Mini drones 802 and 804, with the camera resolution set as 1080P at 60 FPS. By downsampling the frame rate of the videos, we get different camera data with different FPS. We then evaluate the performance of G2Auth in terms of different FPS. The results show there is a significant improvement when FPS is increased from 15 to 20, but the EERs improves little when FPS further increases. FPS≥20 can be satisfied by most cameras today.

Figure 10B:
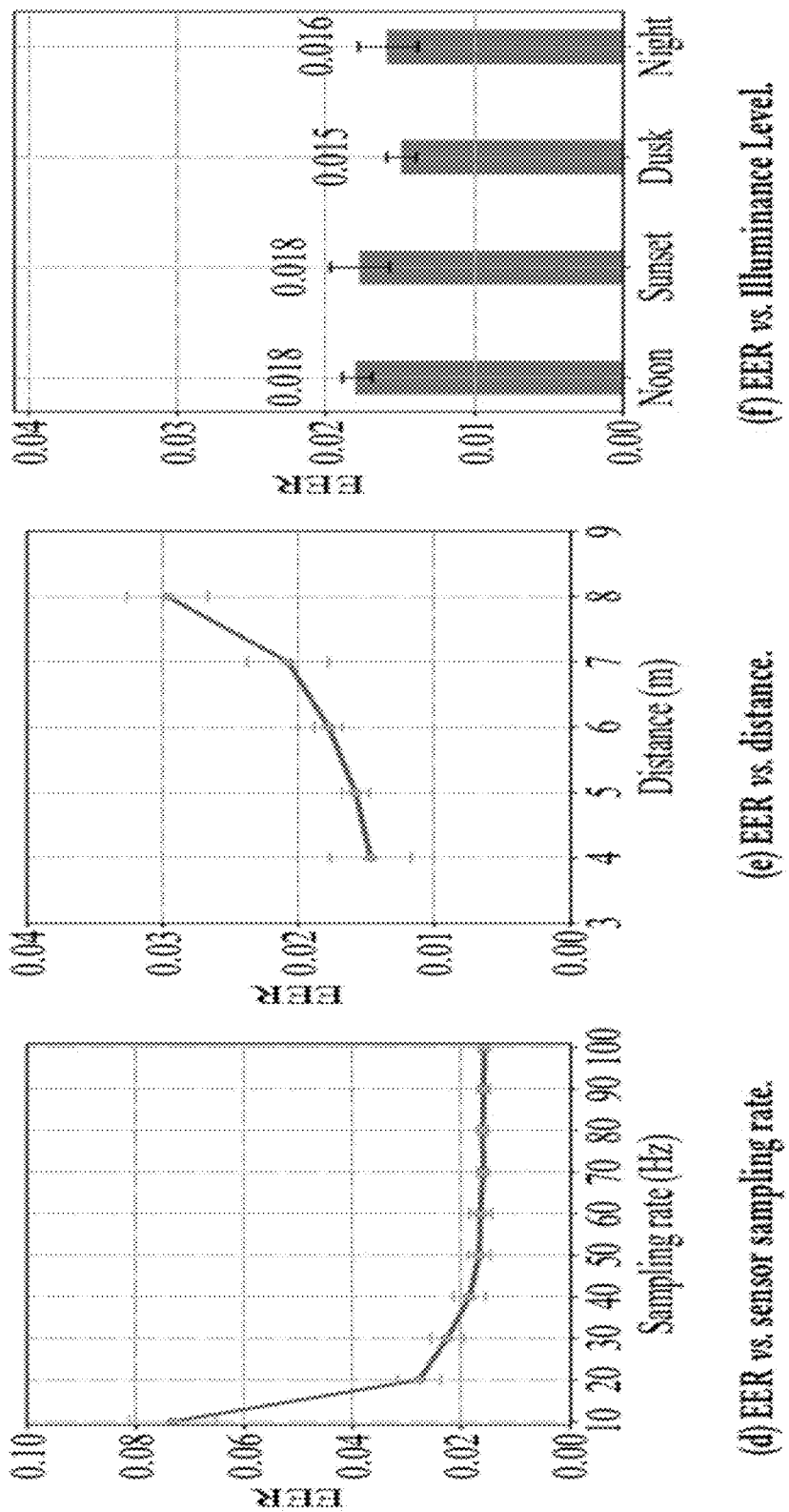
FIG. 10B shows further parameters and experimental settings.

IMU Sensor Sampling Rate. A higher sampling rate can capture subtler characteristics of the IMU sensor data, but it also introduces higher burdens (e.g., data collection and communication). To find the optimal sampling rate for the IMU sensor of smartphones, we study the sampling rate, ranging from 10 Hz to 100 Hz, at a step of 10 Hz by downsampling the original sensor data. FIG. 10B at (d) shows the result. We can see that when the sampling rate increases from 10 HZ to 20 Hz, the performance increases significantly. When the sampling rate is higher than 40 Hz, the performance tends to be stable. We thus select a sampling rate of 50 HZ, which can be satisfied by most IMU sensors.

Smartphones. Besides the two smartphones that were used to collect Dataset I and Dataset II, we select three more as shown in FIG. 8: (1) a small Android Phone, Unihertz Atom 814, with 96×45×18 mm in dimension and 108 grams in weight, (2) a large Android phone, Honor View 10 812, with 157×75×7 mm in dimension and 172 grams in weight, and (3) iPhone 11 810 with 150.9×75.7×8.3 mm in dimension and 194 grams in weight.

No significant difference is observed in the authentication performance between the three smartphones. We can thus conclude that the smartphone size, weight, and operating system have little impact on the performance of G2Auth.

Horizontal Distance Between User and Drone. We test the stability of G2Auth on different horizontal distances between the user and drone. The horizontal distance D is selected from 4 to 8 meters. We invite 10 participants; each performs the authentication operations 15 times for each distance. In FIG. 10B at (e), when D is increased from 4 to 7 meters, no significant difference is observed; the performance decreases greatly when reaches 8 meters. D≥4 m is far enough to avoid physical attacks where an attacker captures the drone. We thus select D=5 m.

Illuminance Level. To evaluate the impact of illuminance to the performance of our system, we collect data based on different times of the day: (1) Noon, (2) Sunset, (3) Dusk, and (4) Night. FIG. 10B at (f) illustrates the results. G2Auth tends to work slightly better when the light level is low, probably because the flashlight distinguishes itself better in such cases. But no significant difference is observed, showing our system can work under different light levels.

Different Weather. The data collection took multiple weeks, during which there were various weather conditions, such as cloudy, sunny, misty, slightly foggy, light rain. The testing results show that the data collected in different weather have negligible impacts. This is consistent with the overall AUC near 1.

Gender and Age. We group the testing data according to the gender, and finds it has little impact on the accuracy ($EER_{male}$=0.0161 vs. $EER_{female}$=0.0155); so does the age.

View Angle. We assume a delivery drone's camera is easy to identify, see supra, and during our data collection we find participants are able to stand right (or very close) in front of the camera. Still, we are interested in studying the impact of different angles to the accuracy. A view angle is 0 degree if the user stands right in front of the camera, and it increases as the user stands away from that direct sight. More formally, it is the azimuth angle from the point of view of the camera. The DJI Mavic Mini drone used in our experiments supports a 83 degree field of view (FOV), we collect data by varying the view angle from 0 to 25 degrees with a step of 5 degrees. The results show that the angle of view has a very small impact on the system performance and G2Auth can work in a wide range of view angles.

Authentication Time

We evaluate the average authentication time needed for G2Auth, which begins when a user starts the authentication, and ends when a decision is made. It mainly contains three parts: (1) time for authentication operations; (2) time for data transmission; and (3) time for data processing and decision making (our prototype uses a trusted cloud server to offload the computation). Time for each part is shown in Table 2, see FIG. 11. The total time for authentication (from waving to decision making), without pauses and with pauses, is 3.36±0.75 s and 4.54±1.10 s on average, respectively. Thus, G2Auth can make a decision quickly.

Usability Study

Scanning a QR code and inputting a password are two of the most widely used authentication methods. So, it helps by comparing the usability of our method against that of the two well-accepted methods, although we are aware that the two methods are insecure/inapplicable for drone delivery authentication.

To find out how user accept the new authentication approach, we investigate the usability of G2Auth. Since there is currently no mutual authentication methods without user-side infrastructure for drone delivery, we compare our approach with password-based and Quick Response (QR) code based authentication methods, both of which are currently widely used in IoT devices, see João F C B Ramalho, Sandra F H Correia, Lianshe Fu, Lara L F António, Carlos D S Brites, Paulo S André, Rute A S Ferreira, and Luís D Carlos. 2019. *Luminescence Thermometry on the Route of the Mobile-Based Internet of Things (IoT): How Smart QR Codes Make It Real. Advanced Science* 6, 19 (2019), 1900950., Trusit Shah and Subbarayan Venkatesan. 2018 and *Authentication of IoT device and IoT server using secure vaults*. In 2018 17*th IEEE International Conference On Trust, Security And Privacy In Computing And Communications*/12*th IEEE International Conference On Big Data Science And Engineering (TrustCom/BigDataSE)*. IEEE, 819-824. Note that we are aware that they are vulnerable to relay attacks.

Recruitment and Design

We recruit 60 subjects for this study, including 29 females and 31 males whose ages range from 15 to 68, to participate in the data collections. These subjects do not have computer security background and they did not participate in our previous experiments. To avoid bias, these subjects are not informed of any method designed by us. Instead, they are told to evaluate the usability of different authentication methods. The usability study was conducted under an IRB approval.

We first ask each subject to sign a consent form and then introduce the three authentication methods. For a password-based method, we randomly generate an 8-character alphanumeric password, which is the most common length of a password, see Luke St Clair, Lisa Johansen, William Enck, Matthew Pirretti, Patrick Traynor, Patrick McDaniel, and Trent Jaeger. 2006. *Password exhaustion: Predicting the end of password usefulness*. In *International Conference on Information Systems Security*. Springer, 37-55, and show the password to the subject before authentication. For QR code based method, a Nexus 5X smartphone, with a 5.2" screen, is used to generate and display the QR code. Next, each subject is instructed to perform five authentication attempts to get familiar with these methods. These attempts are all excluded from further analysis. After that, each subject performs another three authentication attempts for each method and the order of using these methods is randomized.

Finally, each subject scores the three methods by answering five questions, which are adapted from the widely-used SUS, see John Brooke. 1996. *SUS: a "quick and dirty" usability. Usability evaluation in industry* (1996), 189. The five questions are listed as follows: (1) I thought the authentication method was easy to use; (2) I am satisfied with the amount of time it took to complete the authentication; (3) I thought the authentication method was convenient; (4) I think it is easy to learn the authentication method; and (5) I felt comfortable using the authentication method. On a scale between strongly disagree and strongly agree, the ratings for each question range from 1 to 5 (higher is better).

Usability Study Results

Figure 13:
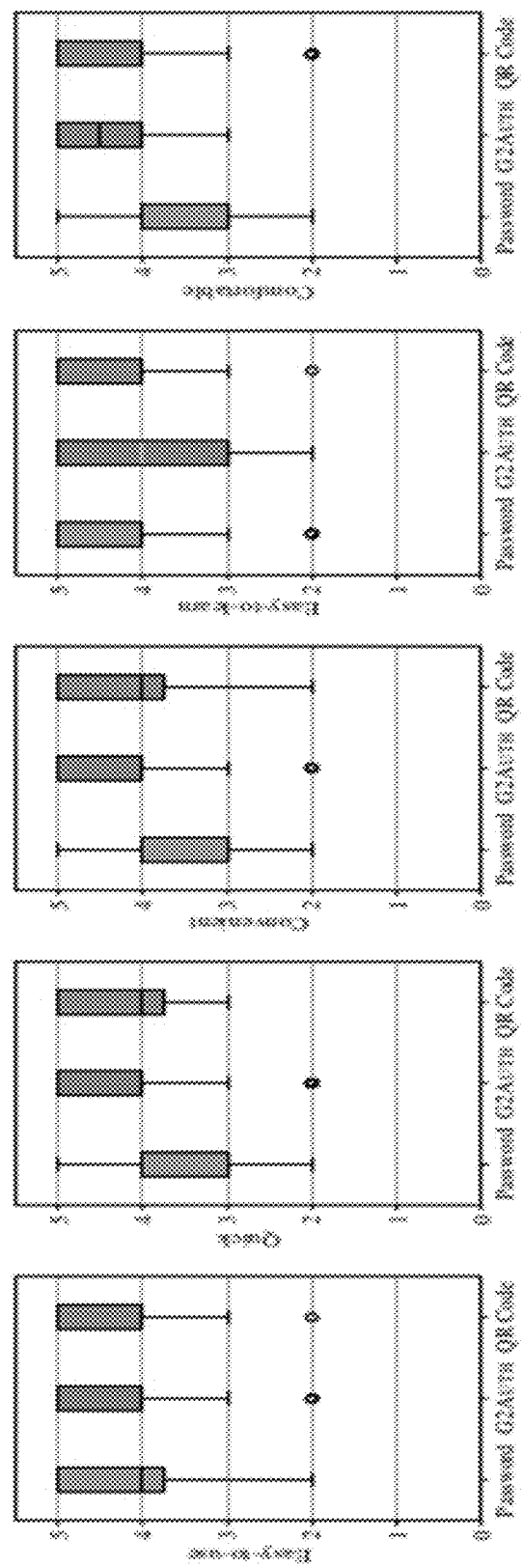
FIG. 13 shows usability study results.

Perceived usability. The total scores for password-based method, G2Auth, and QR code based method are 18.65±2.26, 21.30±2.39, 21.355±2.29. The scores show that users perceive better usability of G2Auth and QR code based method than an 8-character password. The difference between G2Auth and QR code based method is small, which indicates that they achieve similar user-acceptance levels. The average authentication time for using G2Auth, password-based, and QR code based approach is 3.4±0.63 s, 9.4±0.76 s, and 5.3±0.88 s, respectively. Thus, G2Auth takes less time than the other two methods. See FIG. 13.

Failure rate. Each subject operates authentication operations three times for each method, so there are totally 180 (60×3) times of authentication for each method. For QR code based method, since we regard a successful decoding as the sign of ending, it achieves a success rate of 1. For the other two methods, we observe 6 failures for G2Auth and 15 failures for passwords. This result indicates our method has a lower failure rate than the password-based method.

Related Work

G2Auth can be categorized as correlation-based authentication. Many well-known systems are proposed in this direction, see Nikolaos Karapanos, Claudio Marforio, Claudio Soriente, and Srdjan Capkun. 2015. *Sound-Proof: Usable Two-Factor Authentication Based on Ambient Sound*. In 24*th USENIX Security Symposium* (*USENIX Security*), Xiaopeng Li, Fengyao Yan, Fei Zuo, Qiang Zeng, and Lannan Luo. 2019. *Touch Well Before Use: Intuitive and Secure Authentication for IoT Devices*. In *The 25th Annual International Conference on Mobile Computing and Networking* (*MobiCom*). 1-17, Shrirang Mare, Andrés Molina Markham, Cory Cornelius, Ronald Peterson, and David Kotz. 2014. *Zebra: Zero-effort bilateral recurring authentication*. In *IEEE Symposium on Security and Privacy* (Oakland), and Shrirang Mare, Reza Rawassizadeh, Ronald Peterson, and David Kotz. 2018. *SAW: Wristband-based Authentication for Desktop Computers*. For example, ZEBRA, see Id., authenticates a desktop user by comparing the activity sequence inferred from IMU data, collected by the user's smartwatch, against actual operations on the mouse and keyboard. There are many pairing works based on correlation also, see Jun Han, Albert Jin Chung, Manal Kumar Sinha, Madhumitha Harishankar, Shijia Pan, Hae Young Noh, Pei Zhang, and Patrick Tague. 2018. *Do you feel what I hear? Enabling autonomous IoT device pairing using different sensor types*. In 2018 *IEEE Symposium on Security and Privacy* (*SP*). IEEE, 836-852, Xiaopeng Li, Qiang Zeng, Lannan Luo, and Tongbo Luo. 2020. *T2Pair: Secure and Usable Pairing for Heterogeneous IoT Devices*. In *Proceedings of the ACM Conference on Computer & Communications Security* (*CCS*), Rene Mayrhofer and Hans Gellersen. 2009. *Shake well before use: Intuitive and secure pairing of mobile devices. IEEE Transactions on Mobile Computing* 8, 6 (2009), Markus Miettinen, N. Asokan, Thien Duc Nguyen, Ahmad-Reza Sadeghi, and Majid Sobhani. 2014. *Context-Based Zero-Interaction Pairing and Key Evolution for Advanced Personal Devices*. In *Proceedings of the 2014 ACM SIGSAC Conference on Computer and Communications Security* (*CCS*), Masoud Rostami, Ari Juels, and Farinaz Koushanfar. 2013. *Heart-to-Heart (H2H): Authentication for Implanted Medical Devices*. In *Proceedings of the 2013 ACM SIGSAC Conference on Computer and Communications Security* (*CCS*), Wei Wang, Lin Yang, and Qian Zhang. 2016. Touch-and-guard: secure pairing through hand resonance. In Proceedings of the 2016 ACM International Joint Conference on Pervasive and Ubiquitous Computing (UbiComp), and Zhenyu Yan, Qun Song, Rui Tan, Yang Li, and Adams Wai Kin Kong. 2019. *Towards touch-to-access device authentication using induced body electric potentials*. In *The 25th Annual International Conference on Mobile Computing and Networking* (*MobiCom*). 1-16, where pairing succeeds if devices have correlated observations about the surrounding or operations. This does not suit drone-delivery authentication, as a malicious drone can fly near a user to obtain correlated observations, which should not warrant authentication. Along the direction of correlation-based authentication, G2Auth is the first for drone delivery and has resolved many unique challenges, see supra, raised by the varying outdoor environments and the distance between drone and user.

Many studies are done on UAVs, such as fighting fake video timestamps, Zhipeng Tang, Fabien Delattre, Pia Bideau, Mark D Corner, and Erik Learned-Miller. 2020. C-14: *assured timestamps for drone videos*. In *Proceedings of the 26th Annual International Conference on Mobile Computing and Networking*. 1-13, audio side channels, see Adeola Bannis, Hae Young Noh, and Pei Zhang. 2020. *Bleep: motorenabled audio side-channel for constrained UAVs*. In *Proceedings of the 26th Annual International Conference on Mobile Computing and Networking*. 1-13, stolen credentials, Jangirala Srinivas, Ashok Kumar Das, Neeraj Kumar, and Joel J P C Rodrigues. 2019. *TCALAS: Temporal credential-based anonymous lightweight authentication scheme for Internet of drones environment. IEEE Transactions on Vehicular Technology* 68, 7 (2019), 6903-6916., and network attacks, see Mohamed Amine Ferrag and Leandros Maglaras. 2019. *DeliveryCoin: An IDS and blockchain-based delivery framework for drone-delivered services*. Computers 8, 3 (2019), 58. Patents and research works have been devoted to solving the important authentication problem. However, there still does not exist a secure authentication solution resilient to relay attacks. None of them support mutual authentication without dedicated user-side infrastructure. For example, WALMART's patent proposes to deploy a user side dock/lockbox, which is installed with a beacon tag and a receiver, to conduct mutual authentication; plus, it is still vulnerable to relay attacks. Secure mutual authentication without special user-side infrastructure is not available prior to this work.

Unlike biometrics-based authentication, G2Auth does not use biometrics. It does not need to collect the user biometric information and has no concern that a user's waving habit might change over time. As it compares the video recorded by a drone with the IMU data from one smartphone (rather than all smartphones), its accuracy does not degrade as the user base grows.

Limitations and Future Work

G2Auth works well under various weather conditions during our experiments. We have not tested very windy or foggy weather yet. However, DJI's manual, e.g., states "do not use the aircraft in severe weather conditions including wind speeds exceeding 8 m/s, snow, rain, and fog", see DJI. 2019. User Manual for Mavic Mini. dl.djicdn.com/downloads/Mavic_Mini/ Mavic_Mini_User_Manual_v1.0_en.pdf. Indeed, if the wind or fog is so heavy, the safety of drones probably becomes an issue; in that case, the delivery should not be conducted in the first place.

Some users may have privacy concerns about the video recording their faces. Such users can wear masks or cover faces using hands, as G2Auth does not rely on face biometrics. Our usability study has not received such concerns.

Compared to lockbox/dock based authentication, G2Auth has a limitation that requires the user to be present for package delivery. We regard G2Auth to be complementary to such approaches for these reasons: (1) depending on the distance of the lockbox, a user may prefer to send/receive package on her lawn; (2) G2Auth does not need infrastructure like lockboxes; and (3) unless distance bounding becomes mature and widely deployed, existing lockbox solutions are still vulnerable to relay attacks.

Our future work will incorporate ambient information, such as sound, see Nikolaos Karapanos, Claudio Marforio, Claudio Soriente, and Srdjan Capkun. 2015. *Sound-Proof: Usable Two-Factor Authentication Based on Ambient Sound*. In 24th *USENIX Security Symposium* (*USENIX Security*), into the correlation examination, and will extend the usability study by involving more users.

CONCLUSION

Authentication of drones and users for the emerging drone delivery service is an important but less-studied problem.

We presented the first mutual authentication technique, resilient to relay attacks, without requiring special user-side infrastructure (i.e., only a smartphone is needed on the user side). It is not based on any biometrics, but, rather, it takes on a correlation-based approach. We overcame multiple challenges, such as diverse waving styles, heterogeneous noisy data, nighttime delivery, tracking small objects, to build an accurate and robust solution. To impede trained mimicry attacks, pauses are added to waving operations and enforced automatically. We envision G2Auth can accelerate the deployment of drone delivery and benefit numerous users.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for authenticating a drone delivery comprising:
   an order being placed for delivery via at least one drone;
   the at least one drone coming into physical proximity with at least one communication device;
   wherein the at least one communication device is moved and generates inertial measurement data;
   wherein the at least one drone has a camera to record movement of the at least one communication device to generate drone recorded communications device data;
   generating waving operation information at the at least one drone and at the at least one communication device corresponding to the initial measurement data and the drone recorded communications device data;
   wherein the at least one drone and at least one communication device exchange the waving operation information with one another via a key-protected communication channel such that the at least one drone receives the inertial measurement data from the at least one communication device and the at least one communication device receives the drone recorded communications device data; and
   wherein the at least one communication device and the at least one drone independently perform mutual authentication of the waving operation information via correlating the inertial measurement data generated by the communication device and the drone recorded communications device data obtained by the at least one drone.

2. The method of claim 1, wherein the method is employed at day or night.

3. The method of claim 1, wherein the at least one communication device comprises a smartphone.

4. The method of claim 1, wherein no physical contact is required between the at least one communication device and the at least one drone.

5. The method of claim 1, wherein when a delivery task is assigned to the at least one drone, a unique session key is generated and distributed to the at least one drone and the at least one communication device.

6. The method of claim 1, wherein when the at least one drone arrives at a designated location it establishes the key-protected communication channel.

7. The method of claim 1, wherein after the at least one communication device and the at least one drone independently conclude mutual authentication of the waving operation information, the package is delivered by the at least one drone.

8. The method of claim 1, wherein the waving operation information causes the at least one communication device to generate a sequence of acceleration and gyroscope data and the camera on the at least one drone records the trajectory of the at least one communication device.

9. The method of claim 3, wherein the method generates waving operation information based on a flashlight on the smartphone.

10. The method of claim 1, wherein the least one communication device pauses movement when generating the inertial measurement unit.

11. A system for authenticating a drone delivery comprising:
    at least one drone;
    at least one communication device;
    wherein the at least one communication device is moved and generates an inertial measurement data;
    wherein the at least one drone has a camera to record movement of the at least one communication device to generate drone recorded smartphone data;
    generating waving operation information at the drone and at the at least one communication device corresponding to the initial measurement data and the drone recorded smartphone data;
    wherein the at least one drone and at least one communication device exchange the waving operation information with one another via a key-protected communication channel such that the at least one drone receives the inertial measurement data from the at least one communication device and the at least one communication device receives the drone recorded communications device data; and
    wherein the at least one communication device and the at least one drone independently perform mutual authentication of the waving operation information via correlating the inertial measurement data generated by the communication device and the drone recorded communications device data obtained by the at least one drone.

12. The system of claim 11, wherein the system is employed at day or night.

13. The system of claim 11, wherein the at least one communication device comprises a smartphone.

14. The system of claim 11, wherein no physical contact is required between the at least one communication device and the at least one drone.

15. The system of claim 11, wherein when a delivery task is assigned to the at least one drone, a unique session key is generated and distributed to the at least one drone and the at least one communication device.

16. The system of claim 11, wherein when the at least one drone arrives at a designated location it establishes the key-protected communication channel.

17. The system of claim 11, wherein after the at least one communication device and the at least one drone independently conclude mutual authentication of the waving operation information, the package is delivered by the at least one drone.

18. The system of claim 11, wherein the waving operation information causes the at least one communication device to generate a sequence of acceleration and gyroscope data and the camera on the at least one drone records the trajectory of the at least one communication device.

19. The system of claim 13, wherein the method generates waving operation information based on a flashlight on the smartphone.

20. The system of claim 11, wherein the least one communication device pauses movement when generating the inertial measurement unit.

* * * * *